(12) United States Patent
Miura et al.

(10) Patent No.: US 11,625,851 B2
(45) Date of Patent: Apr. 11, 2023

(54) GEOGRAPHIC OBJECT DETECTION APPARATUS AND GEOGRAPHIC OBJECT DETECTION METHOD

(71) Applicant: Mitsubishi Electric Corporation, Tokyo (JP)

(72) Inventors: Mamoru Miura, Tokyo (JP); Ayako Nemoto, Tokyo (JP); Yoshimi Moriya, Tokyo (JP); Hideyuki Masui, Tokyo (JP); Yusuke Itani, Tokyo (JP); Masashi Watanabe, Tokyo (JP); Katsuyuki Kamei, Tokyo (JP); Takuma Kadoya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 245 days.

(21) Appl. No.: 17/283,250

(22) PCT Filed: Oct. 15, 2019

(86) PCT No.: PCT/JP2019/040369
§ 371 (c)(1),
(2) Date: Apr. 7, 2021

(87) PCT Pub. No.: WO2020/090428
PCT Pub. Date: May 7, 2020

(65) Prior Publication Data
US 2021/0342620 A1 Nov. 4, 2021

(30) Foreign Application Priority Data
Oct. 30, 2018 (JP) .............................. JP2018-204074

(51) Int. Cl.
*G06T 7/70* (2017.01)
*G06V 30/10* (2022.01)
(Continued)

(52) U.S. Cl.
CPC .............. *G06T 7/70* (2017.01); *G06V 10/16* (2022.01); *G06V 10/25* (2022.01); *G06V 10/44* (2022.01);
(Continued)

(58) Field of Classification Search
CPC ........ G06T 7/70; G06V 10/25; G06V 10/803; G06V 20/64; G06V 20/582; G06V 20/63;
(Continued)

(56) References Cited

U.S. PATENT DOCUMENTS

2012/0128210 A1 5/2012 Zobel
2018/0074506 A1* 3/2018 Branson ............ G06F 18/24143
(Continued)

FOREIGN PATENT DOCUMENTS

EP 2 096 575 A2 9/2009
JP 2009-76096 A 4/2009
(Continued)

OTHER PUBLICATIONS

Office Action dated Feb. 15, 2022, in corresponding Japanese patent Application No. 2020-553743, 5 pages.
(Continued)

*Primary Examiner* — Syed Haider
(74) *Attorney, Agent, or Firm* — Xsensus LLP

(57) ABSTRACT

A geographic object recognition unit (120) recognizes, using image data (192) obtained by photographing in a measurement region where a geographic object exists, a type of the geographic object from an image that the image data (192) represents. A position specification unit (130) specifies, using three-dimensional point cloud data (191) indicating a three-dimensional coordinate value of each of a plurality of points in the measurement region, a position of the geographic object.

8 Claims, 23 Drawing Sheets

(51) Int. Cl.
| | |
|---|---|
| *G06V 20/62* | (2022.01) |
| *G06V 20/56* | (2022.01) |
| *G06V 20/64* | (2022.01) |
| *G06V 10/25* | (2022.01) |
| *G06V 30/146* | (2022.01) |
| *G06V 30/19* | (2022.01) |
| *G06V 10/80* | (2022.01) |
| *G06V 10/82* | (2022.01) |
| *G06V 10/10* | (2022.01) |
| *G06V 10/44* | (2022.01) |
| *G06V 20/58* | (2022.01) |

(52) U.S. Cl.
CPC .......... *G06V 10/803* (2022.01); *G06V 10/82* (2022.01); *G06V 20/56* (2022.01); *G06V 20/582* (2022.01); *G06V 20/588* (2022.01); *G06V 20/63* (2022.01); *G06V 20/64* (2022.01); *G06V 20/647* (2022.01); *G06V 30/147* (2022.01); *G06V 30/19173* (2022.01); *G06V 30/10* (2022.01)

(58) Field of Classification Search
CPC ........ G06V 10/82; G06V 10/16; G06V 10/44; G06V 30/147; G06V 20/588; G06V 20/647; G06V 30/19173; G06V 20/56; G06V 30/10
See application file for complete search history.

(56) References Cited

U.S. PATENT DOCUMENTS

| | | | | |
|---|---|---|---|---|
| 2018/0188736 | A1* | 7/2018 | Jian | G05D 1/0231 |
| 2018/0224863 | A1 | 8/2018 | Fu | |
| 2018/0260613 | A1* | 9/2018 | Gao | H04N 23/00 |
| 2019/0156507 | A1* | 5/2019 | Zeng | G06F 16/23 |
| 2019/0206124 | A1* | 7/2019 | Zhou | G01C 21/20 |
| 2019/0258876 | A1* | 8/2019 | Liu | G06V 20/58 |
| 2020/0293058 | A1 | 9/2020 | Fu | |

FOREIGN PATENT DOCUMENTS

| | | |
|---|---|---|
| JP | 2010-224918 A | 10/2010 |
| JP | 2013-506214 A | 2/2013 |
| JP | 2014-92936 A | 5/2014 |
| JP | 2014-130404 A | 7/2014 |
| JP | 2017-26430 A | 2/2017 |
| JP | 2018-523865 A | 8/2018 |

OTHER PUBLICATIONS

European Communication pursuant to Rule 164(1) dated Nov. 25, 2021, in corresponding European Patent Application No. 19879079.2.

International Search Report and Written Opinion dated Jan. 7, 2020, received for PCT Application PCT/JP2019/040369, Filed on Oct. 15, 2019, 10 pages including English Translation.

Zhang, "A Flexible New Technique for Camera Calibration", IEEE Transactions on Pattern Analysis and Machine Intelligence, vol. 22, No. 11, Nov. 2000, pp. 1330-1334.

Jin et al., "Traffic Sign Recognition With Hinge Loss Trained Convolutional Neural Networks," IEEE Transactions on Intelligent Transportation systems, vol. 15, No. 5, Oct. 2014, pp. 1991-2000.

Lecun et al., "Gradient-Based Learning Applied to Document Recognition", Proceedings of the IEEE, vol. 86, No. 11, Nov. 1998, pp. 2278-2324.

Zhou et al., "LIDAR and Vision-Based Real-Time Traffic Sign Detection and Recognition Algorithm for Intelligent Vehicle", International IEEE Conference on Intelligent Transportation Systems (ITSC), Oct. 8-11, 2014, pp. 578-583.

Extended European search report dated Apr. 8, 2022, in corresponding European patent Application No. 19879079.2, 18 pages.

Zhicheng Yan et al., "HD-CNN: Hierarchical Deep Convolutional Neural Networks for Large Scale Visual Recognition", 2015 IEEE International Conference on Computer Vision, IEEE, 2015, pp. 2740-2748.

* cited by examiner

Fig. 16
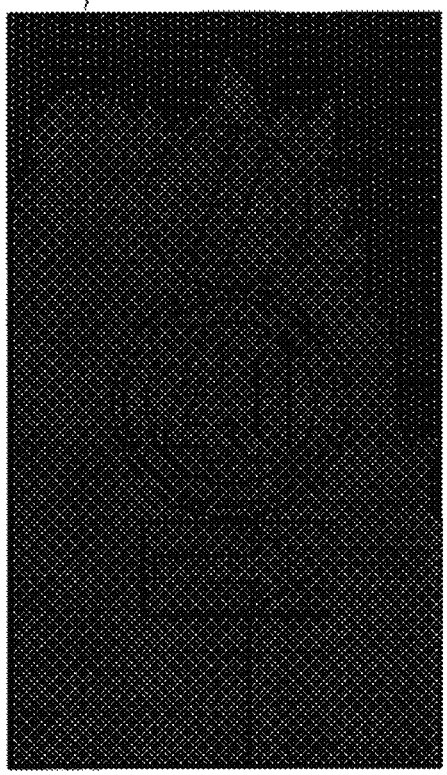 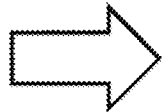 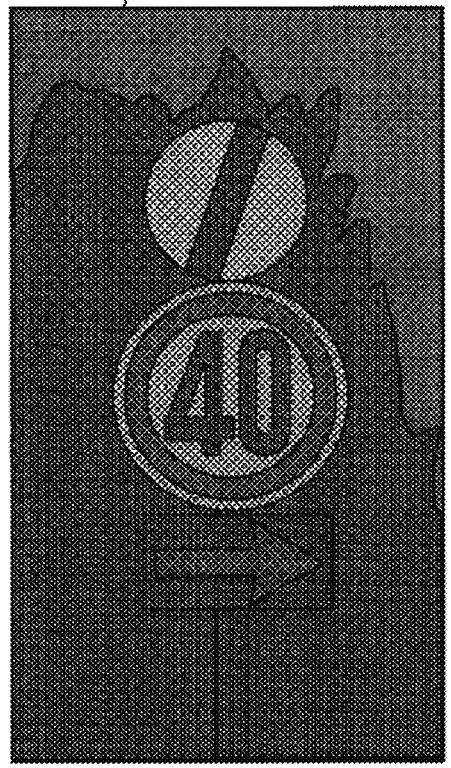

Fig. 20

| INFOR-MATION SIGNS | COLORS | | CHARACTERISTICS — CHARACTERS | | | | | | | | SYMBOLS |
|---|---|---|---|---|---|---|---|---|---|---|---|
| | GREEN | PURPLE | E | T | C | 車 | ー | 般 | 専 | 用 | ARROW |
| G1 | 1 | 0 | 1 | 1 | 1 | 1 | 0 | 0 | 0 | 0 | 1 |
| G2 | 1 | 0 | 0 | 0 | 0 | 0 | 1 | 1 | 0 | 0 | 0 |
| G3 | 0 | 1 | 1 | 1 | 1 | 0 | 0 | 0 | 1 | 1 | 0 |
| INPUT | 1 | 0 | 1 | 1 | 1 | 1 | 0 | 0 | 0 | 0 | 1 |

240: INFORMATION SIGN CHARACTERISTIC DATA

241: INPUT CHARACTERISTIC VECTOR

GEOGRAPHIC OBJECT DETECTION APPARATUS AND GEOGRAPHIC OBJECT DETECTION METHOD

CROSS-REFERENCE TO RELATED APPLICATIONS

The present application is based on PCT filing PCT/JP2019/040369, filed Oct. 15, 2019, which claims priority to JP 2018-204074, filed Oct. 30, 2018, the entire contents of each are incorporated herein by reference.

TECHNICAL FIELD

The present invention relates to technology for realizing highly accurate geographic object detection based on point cloud data and image data.

BACKGROUND ART

Mapping data that indicates a position and a type of an object (a geographic object) on a road is created to realize safe autonomous driving.

The mapping data becomes base data in dynamic map data for realizing the autonomous driving.

Consequently, there is a demand for the mapping data to be updated according to changes in actual roads.

Positions of shoulder edges, demarcation lines, signs, road markings, and the like are written in the mapping data by coordinates on the earth (latitude and longitude, or plane rectangular coordinates).

An autonomous vehicle can understand a current driving environment by referring to the mapping data. And, it becomes possible for the autonomous vehicle to find a most suitable travel route and travel control for itself by combining with the current driving environment, dynamic information of surroundings (positions and the like of other vehicles and pedestrians) sensed in real time.

CITATION LIST

Patent Literature

Patent Literature 1: JP 2017-26430 A

Non-Patent Literature

Non-Patent Literature 1: Z. Zhang, "A flexible new technique for camera calibration," IEEE Transactions on Pattern Analysis and Machine Intelligence, vol. 22, no. 11, pp. 1330-1334, November 2000.

Non-Patent Literature 2: J. Jin, K. Fu, C. Zhang, "Traffic Sign Recognition With Hinge Loss Trained Convolutional Neural Networks," IEEE Transactions on Intelligent Transportation systems, vol. 15 (5), pp. 1991-2000, 2014.

Non-Patent Literature 3: Y. LeCun, L. Bottou, Y. Bengio and P. Haffner, "Gradient-based learning applied to document recognition," Proceedings of the IEEE, vol. 86, no. 11, pp. 2278-2324, 1998.

SUMMARY OF INVENTION

Technical Problem

Point cloud data and image data are obtained by Mobile Mapping System (MMS). And, the mapping data is created manually based on the point cloud data and the image data.

To create the mapping data of roads that spread widely, however, very high labor costs and very high temporal costs are in demand. Consequently, there is a demand for automated mapping technology that creates the mapping data automatically.

And, highly accurate mapping is in demand for the automated mapping technology. Highly accurate mentioned here means that there is no error in a type of a geographic object in the mapping data, that is, there is no discrepancy between the type of the geographic object indicated in the mapping data and a type of a geographic object that exists on an actual road.

Extraction of the geographic object using the point cloud data or the image data is known.

In Patent Literature 1, finding a sign from a point cloud cluster is described.

The extraction using only either of the data, however, is not enough to create the mapping data that is highly accurate. In extraction using only the point cloud data, a three-dimensional position of the geographic object can be specified, but on the other hand, recognizing the type of the geographic object is difficult. In extraction using only the image data, the type of the geographic object can be specified, but on the other hand the three-dimensional position of the geographic object cannot be specified. In addition, misrecognition of the geographic object or overlooking of the geographic object occurs depending on photographing timing of an image or a positional relationship with the geographic object at a time of photographing.

Technology for using the point cloud data and the image data is disclosed in Non-Patent Literature 1 to Non-Patent Literature 3. Each Non-Patent Literature will be described later.

The present invention aims to make geographic object detection that is highly accurate be realized based on point cloud data and image data.

Solution to Problem

A geographic object detection apparatus of the present invention includes: a geographic object recognition unit to recognize, using image data obtained by photographing in a measurement region where a geographic object exists, a type of the geographic object from an image that the image data represents; and a position specification unit to specify, using three-dimensional point cloud data indicating a three-dimensional coordinate value of each of a plurality of points in the measurement region, a position of the geographic object.

Advantageous Effects of Invention

According to the present invention, a type of a geographic object can be recognized using image data and a position of the geographic object can be specified using point cloud data.

Therefore, realizing geographic object detection that is highly accurate based on the point cloud data and the image data will be possible.

BRIEF DESCRIPTION OF DRAWINGS

FIG. 16 is a diagram illustrating a gamma correction of an area image 214 according to Embodiment 1.

FIG. 20 is a diagram illustrating information sign characteristic data 240 and an input characteristic vector 241 according to Embodiment 1.

DESCRIPTION OF EMBODIMENTS

Figure 1:
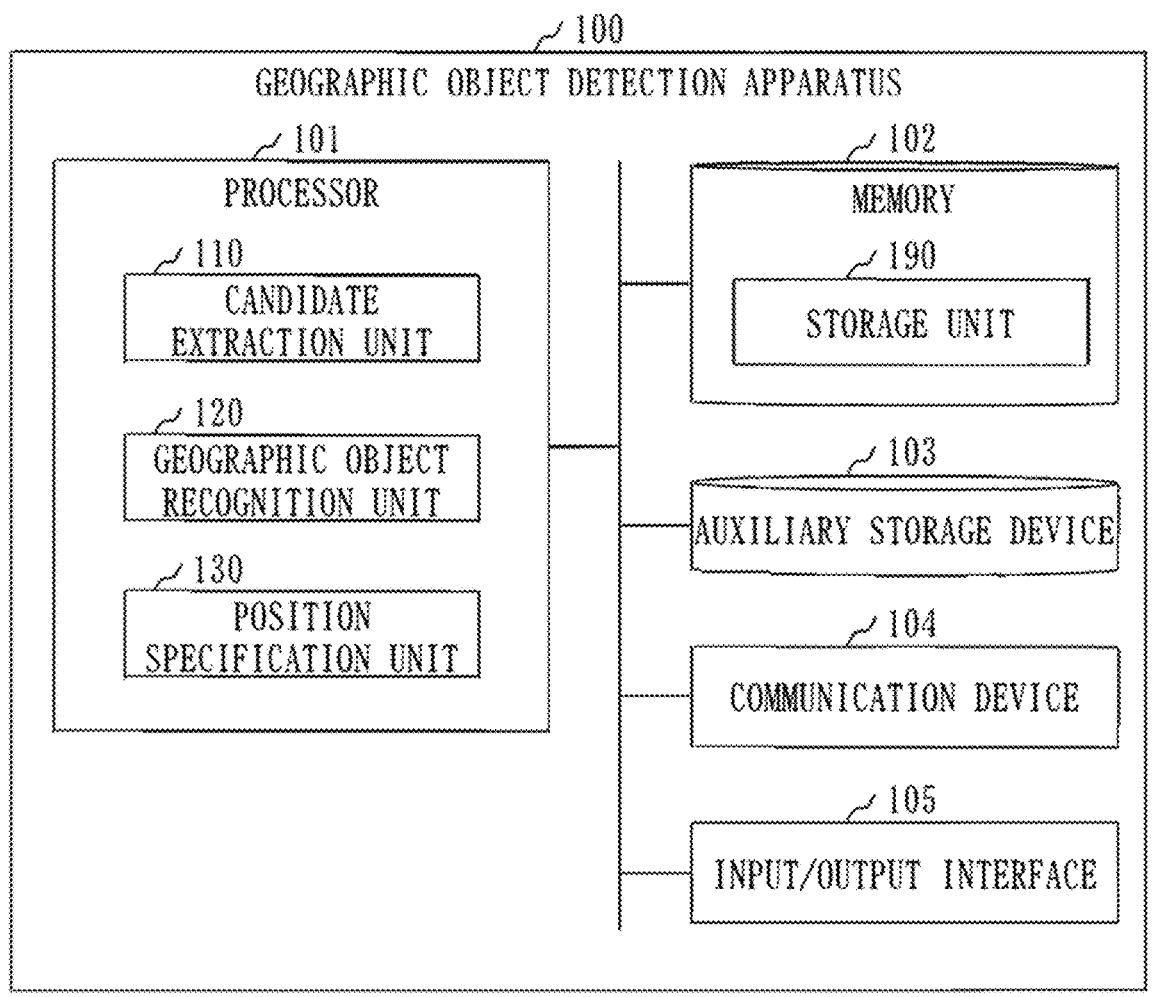
FIG. 1 is a configuration diagram of a geographic object detection apparatus 100 according to Embodiment 1.

In the embodiments and in the drawings, the same elements or corresponding elements are denoted by the same reference signs. Description of elements denoted by the same reference signs as the elements described will be suitably omitted or simplified. Arrows in the drawings mainly indicate flows of data or flows of processes.

Embodiment 1

A mode of detecting a geographic object that exists in a measurement region using three-dimensional point cloud data and image data will be described based on FIG. 1 to FIG. 23.

Especially, a mode of detecting a road sign will be described.

Description of Configuration

A configuration of a geographic object detection apparatus 100 will be described based on FIG. 1.

The geographic object detection apparatus 100 is a computer that includes hardware such as a processor 101, a memory 102, an auxiliary storage device 103, a communication device 104, and an input/output interface 105. These hardware are connected to each other via signal lines.

The processor 101 is an IC (Integrated Circuit) that performs a calculation process, and controls other hardware. For example, the processor 101 is a CPU (Central Processing Unit), a DSP (Digital Signal Processor), or a GPU (Graphics Processing Unit).

The memory 102 is a volatile storage device. The memory 102 is also called a main storage device or a main memory. For example, the memory 102 is a RAM (Random Access Memory). Data stored in the memory 102 is saved in the auxiliary storage device 103 as necessary.

The auxiliary storage device 103 is a non-volatile storage device. For example, the auxiliary storage device 103 is a ROM (Read Only Memory), an HDD (Hard Disk Drive), or a flash memory. Data stored in the auxiliary storage device 103 is loaded into the memory 102 as necessary.

The communication device 104 is a receiver and a transmitter. For example, the communication device 104 is a communication chip or an NIC (Network Interface Card).

The input/output interface 105 is a port to which an input device and an output device are connected. For example, the input/output interface 105 is a USB terminal, the input device is a keyboard and a mouse, and the output device is a display. USB is an abbreviated name for Universal Serial Bus.

The geographic object detection apparatus 100 includes elements such as a candidate extraction unit 110, a geographic object recognition unit 120, and a position specification unit 130. These elements are realized by software.

A geographic object detection program for making a computer function as the candidate extraction unit 110, the geographic object recognition unit 120, and the position specification unit 130 is stored in the auxiliary storage device 103. The geographic object detection program is loaded into the memory 102 and executed by the processor 101.

Furthermore, an OS (Operating System) is stored in the auxiliary storage device 103. At least a part of the OS is loaded into the memory 102 and executed by the processor 101.

That is, the processor 101 executes the geographic object detection program while executing the OS.

Data obtained by executing the geographic object detection program is stored in a storage device such as the memory 102, the auxiliary storage device 103, a register in the processor 101, or a cache memory in the processor 101.

The memory 102 functions as a storage unit 190. Another storage device, however, may function as the storage unit 190 instead of the memory 102 or with the memory 102.

The geographic object detection apparatus 100 may include a plurality of processors that replace the processor 101. The plurality of processors share a role of the processor 101.

The geographic object detection program can be computer-readably recorded (stored) in a non-volatile recording medium such as an optical disc, the flash memory, or the like.

A configuration of the storage unit 190 will be described based on FIG. 2.

Three-dimensional point cloud data 191 and a plurality of pieces of image data 192 are stored in the storage unit 190. Furthermore, various types of data to be used in the geographic object detection apparatus 100 is stored in the storage unit 190 (illustration omitted).

The three-dimensional point cloud data 191 and the plurality of pieces of image data 192 are generated by Mobile Mapping System (MMS).

In MMS, a measurement vehicle onto which various types of measurement devices such as a GPS receiver, an IMU, a laser radar, and a camera are mounted, is used. GPS is an abbreviated name for Global Positioning System. The GPS receiver is a positioning device. IMU is an abbreviated name for Inertial Measurement Unit.

The measurement vehicle is a vehicle that performs various types of measurements while travelling.

For example, a position and posture of the measurement vehicle at any particular time are measured by the GPS receiver and the IMU. A laser measurement is performed by the laser radar. The measurement region is photographed at various locations in the measurement region by the camera.

The measurement region is a region measured by the measurement vehicle.

Various types of measurement data relating to the measurement region are obtained by the measurement vehicle.

For example, position posture data, distance direction point cloud data, the image data 192, and the like are obtained.

The position posture data indicates the position and the posture of the measurement vehicle at any particular time.

The distance direction point cloud data indicates a distance and a direction from the laser radar to each point at any particular time.

The image data 192 represents an image in which a photographed area of the measurement region is shown.

The three-dimensional point cloud data 191 is generated using vehicle position data, the distance direction point cloud data, and the like.

The three-dimensional point cloud data 191 indicates a three-dimensional coordinate value of each of a plurality of points in the measurement region. The three-dimensional point cloud data 191 includes a plurality of three-dimensional points. Each three-dimensional point is data that represents a point that reflected laser light.

Each three-dimensional point indicates measurement time, the three-dimensional coordinate value, reflection intensity, and the like. The measurement time that the three-dimensional point indicates is time when a laser measurement was performed for the point represented by the three-dimensional point. The three-dimensional coordinate value that the three-dimensional point indicates specifies a position of the point represented by the three-dimensional point. The reflection intensity that the three-dimensional point indicates is intensity of laser light that the laser radar received from the point represented by the three-dimensional point.

The image data 192 is obtained by photographing in the measurement region.

The plurality of pieces of image data 192 are obtained by photographing at a plurality of photographing points.

Various types of geographic objects, such as a road sign, a road marking, or the like exist in the measurement region. And, the various types of geographic objects that exist in the measurement region are shown in the image that the image data 192 represents.

Description of Operation

Operation of the geographic object detection apparatus 100 is equivalent to a geographic object detection method. A procedure of the geographic object detection method is equivalent to a procedure of the geographic object detection program.

A summary of the geographic object detection method will be described based on FIG. 3.

In step S110, the candidate extraction unit 110 calculates a group of candidate areas using the three-dimensional point cloud data 191.

The group of candidate areas is one or more candidate areas.

The candidate area is a candidate for a geographic object area. At least a part of the geographic object area is included in the candidate area.

The geographic object area is a three-dimensional area where the geographic object is positioned.

Figure 4:
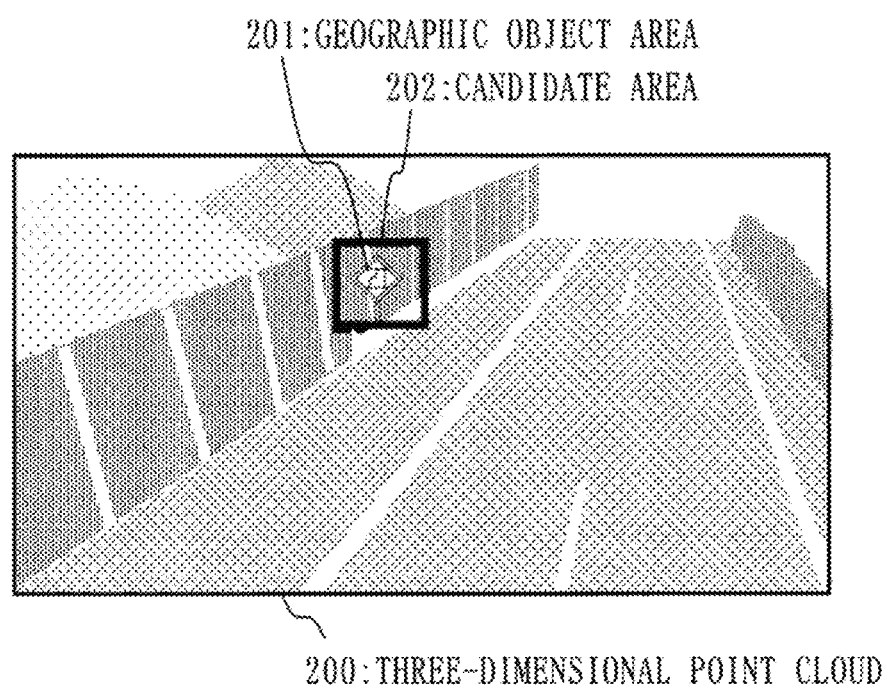
FIG. 4 is a diagram illustrating a three-dimensional point cloud 200 according to Embodiment 1.

A three-dimensional point cloud 200 is illustrated in FIG. 4.

The three-dimensional point cloud 200 represents an example of a three-dimensional point cloud included in the three-dimensional point cloud data 191. A candidate area 202 for the geographic object, the geographic object being a road sign, a road marking or the like, is included in the three-dimensional point cloud 200.

A geographic object area 201 is an area where a road sign indicating "Decrease in lanes" is positioned. The plurality of three-dimensional points are positioned in the geographic object area 201.

Returning to FIG. 3, the description will continue from step S120.

In step S120, the geographic object recognition unit 120 calculates, for each piece of image data 192, a group of candidate image areas corresponding to the group of candidate areas using the image data 192.

The group of candidate image areas is one or more candidate image areas.

The candidate image area is an area where the candidate area is shown in the image that the image data 192 represents.

In step S130, the geographic object recognition unit 120 obtains, for each piece of image data 192, a geographic object image area and an identification result candidate according to geographic object, based on the group of candidate image areas.

Specifically, the geographic object recognition unit 120 obtains the geographic object image area and the identification result candidate by image processing on the candidate image area in the image that the image data 192 represents.

The geographic object image area is an area where the geographic object is shown in the image that the image data 192 represents. That is, the geographic object image area is an area where the geographic object area is shown in the image that the image data 192 represents.

The identification result candidate is a candidate for an identification result for identifying the geographic object.

When a geographic object is shown in one image, one geographic object image area and one identification result candidate are obtained.

When a same geographic object is shown in a plurality of images, a plurality of geographic object image areas and a plurality of identification result candidates are obtained.

That is, for each geographic object, one or more geographic object image areas and one or more identification result candidates are obtained. One or more geographic object image areas of each geographic object is called "group of geographic object image areas". One or more identification result candidates of each geographic object is called "group of identification result candidates".

Figure 5:
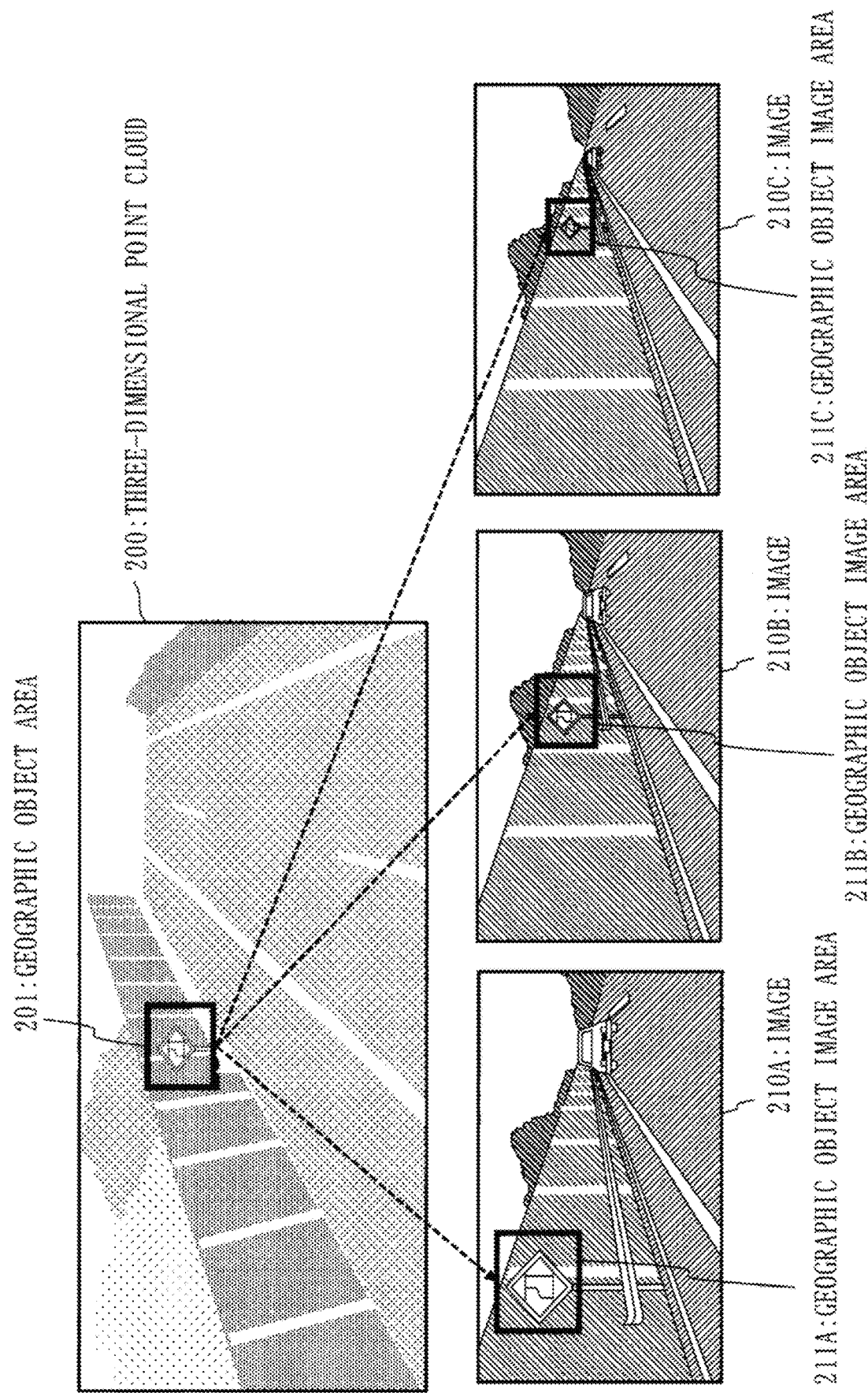
FIG. 5 is a diagram illustrating an association between the three-dimensional point cloud 200 and an image 210 according to Embodiment 1.

An association between the three-dimensional point cloud 200 and an image 210 is illustrated in FIG. 5.

An image 210A is an image that image data 192A represents.

An image 210B is an image that image data 192B represents.

An image 210C is an image that image data 192C represents.

A geographic object image area 211A is an area where the geographic object area 201 is shown in the image 210A.

A geographic object image area 211B is an area where the geographic object area 201 is shown in the image 210B.

A geographic object image area 211C is an area where the geographic object area 201 is shown in the image 210C.

A road sign, "Decrease in lanes", is identified based on each geographic object image area 211.

Returning to FIG. 3, the description will continue from step S140.

In step S140, the position specification unit 130 calculates a temporary area for each geographic object image area of each image using the three-dimensional point cloud data 191.

The temporary area is a temporary three-dimensional area corresponding to the geographic object image area. That is, the temporary area is a temporary geographic object area.

When a geographic object is shown in one image, one temporary area corresponding to one geographic object image area in one image is calculated.

When a same geographic object is shown in a plurality of images, a plurality of temporary areas corresponding to a plurality of geographic object image areas in a plurality of images are calculated.

That is, for each geographic object, one or more temporary areas corresponding to one or more geographic object image areas are calculated. One or more temporary areas of each geographic object is called "group of temporary areas".

In step S150, the position specification unit 130 calculates, for each geographic object, a geographic object area based on the group of temporary areas.

Furthermore, the geographic object recognition unit 120 determines, for each geographic object, an identification result based on the group of identification result candidates.

Figure 6:
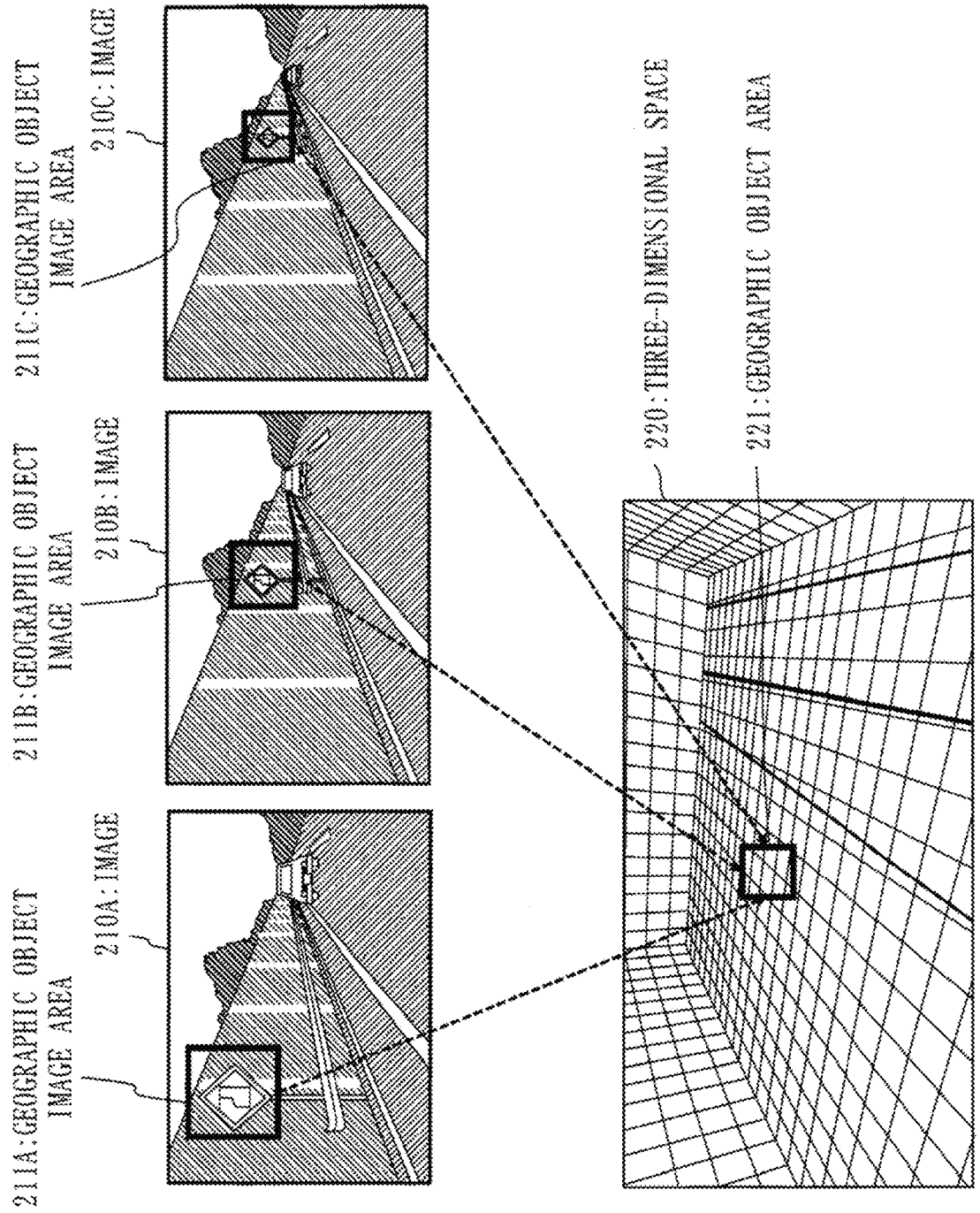
FIG. 6 is a diagram illustrating an association between the image 210 and a three-dimensional space 220 according to Embodiment 1.

An association between the image 210 and a three-dimensional space 220 is illustrated in FIG. 6.

The three-dimensional space 220 is a three-dimensional space for representing the measurement region.

A geographic object area 221 is a geographic object area in the three-dimensional space 220.

The geographic object area 221 is obtained by merging a three-dimensional area corresponding to the geographic object image area 211A, a three-dimensional area corresponding to the geographic object image area 211B, and a three-dimensional area corresponding to the geographic object image area 211C.

A type of the geographic object is obtained by merging an identification result based on the geographic object image area 211A, an identification result based on the geographic object image area 211B, and an identification result based on the geographic object image area 211C.

Hereinafter, details of the geographic object detection method is described.

The geographic object has a plane. Specifically, the geographic object has a planar shape.

In the description hereinafter, the geographic object detection apparatus 100 detects a road sign. The road sign is a specific example of the geographic object detected by the geographic object detection apparatus 100.

Figure 7:
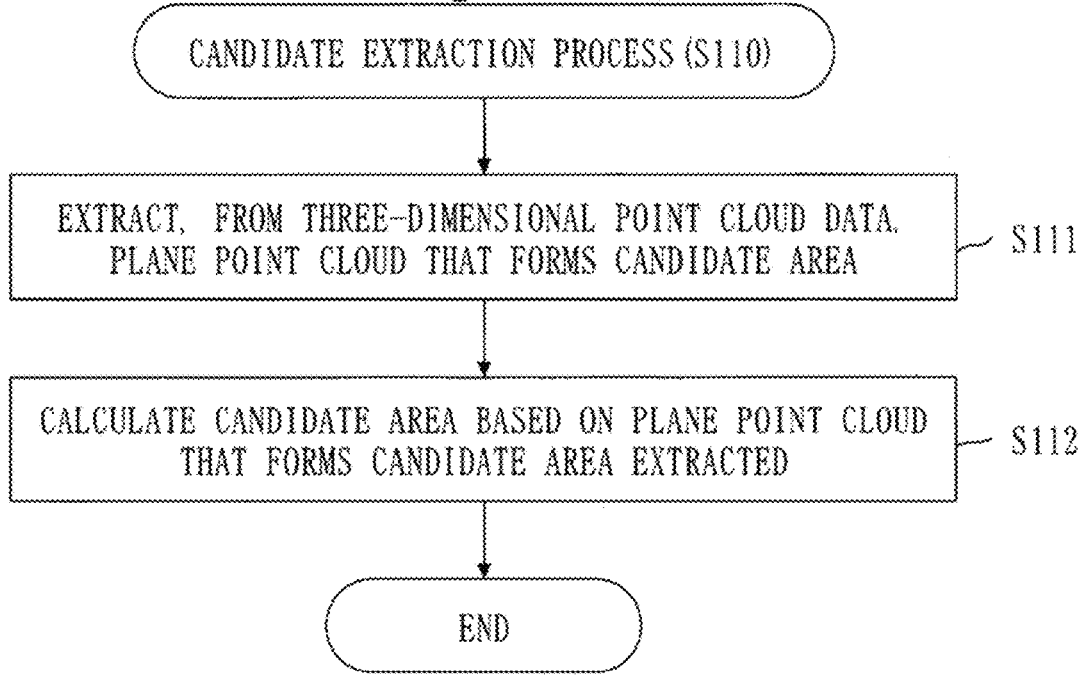
FIG. 7 is a flowchart of a candidate extraction process (S110) according to Embodiment 1.

A procedure of a candidate extraction process (S110) will be described based on FIG. 7.

In step S111, the candidate extraction unit 110 extracts, from the three-dimensional point cloud data 191, a plane point cloud that forms the candidate area. The plane point cloud to be extracted may be more than one.

The plane point cloud is one or more three-dimensional points that represent one or more points positioned in a same plane. An approximate plane is included in the "plane".

Figure 8:
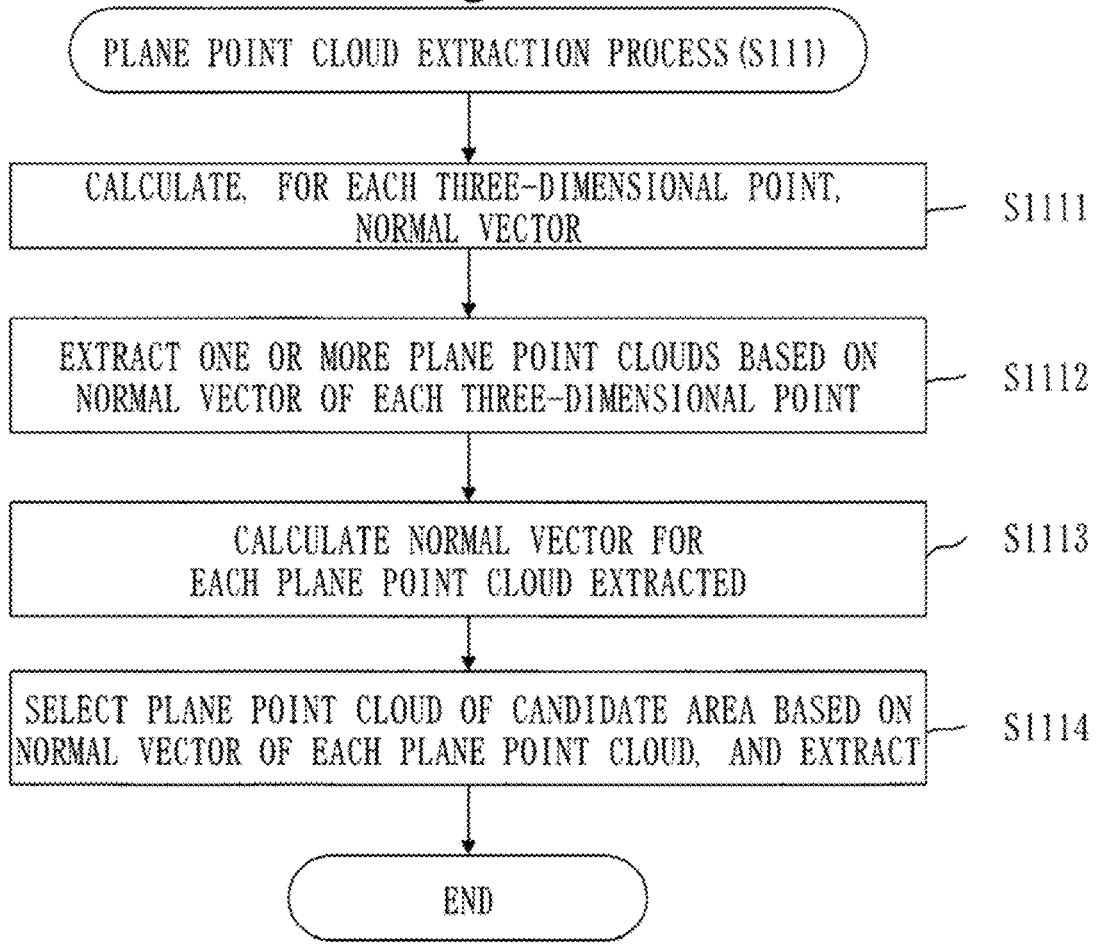
FIG. 8 is a flowchart of a plane point cloud extraction process (S111) according to Embodiment 1.

A plane point cloud extraction process (S111) will be described based on FIG. 8.

In step S1111, the candidate extraction unit 110 calculates, for each three-dimensional point, a normal vector to a plane on which the three-dimensional point is included.

The candidate extraction unit 110 calculates a normal vector of the three-dimensional point as follows. A three-dimensional point that is to be a target is called "target point".

First, the candidate extraction unit 110 determines a surrounding area of the target point. The surrounding area is a three-dimensional area that includes the target point. Size of the surrounding area is determined beforehand.

Next, the candidate extraction unit 110 extracts one or more three-dimensional points included in the surrounding area from the three-dimensional point cloud data 191. One or more three-dimensional points extracted is called "surrounding area point cloud".

Next, the candidate extraction unit 110 calculates an approximate plane based on one or more three-dimensional coordinate values indicated by one or more three-dimensional points included in the surrounding area point cloud.

Then, the candidate extraction unit 110 calculates a normal vector of the approximate plane.

In step S1112, the candidate extraction unit 110 extracts one or more plane point clouds based on the normal vector of each three-dimensional point.

The candidate extraction unit 110 extracts one or more plane point clouds as follows.

The candidate extraction unit 110 clusters the plurality of three-dimensional points based on the three-dimensional coordinate value of each three-dimensional point and the normal vector of each three-dimensional point.

Thus, one or more clusters are obtained. Each cluster includes the plurality of three-dimensional points, the plurality of the three-dimensional points are positioned in an area in the vicinity, and an angle that the normal vector of each of the plurality of three-dimensional points forms is included in an approximate range. The area in the vicinity is a three-dimensional area having a size determined beforehand. The approximate range is a range in which the angle is determined beforehand.

One or more clusters to be obtained are one or more plane point clouds.

In step S1113, the candidate extraction unit 110 calculates a normal vector for each plane point cloud extracted.

The candidate extraction unit 110 calculates the normal vector of the plane point cloud as follows. A plane point cloud that is to be a target is called "target point cloud".

First, the candidate extraction unit 110 calculates the approximate plane based on a plurality of three-dimensional points included in the target point cloud.

Then, the candidate extraction unit 110 calculates the normal vector of the approximate plane.

In step S1114, the candidate extraction unit 110 selects the plane point cloud that forms the candidate area based on the normal vector of each plane point cloud, and extracts the plane point cloud.

The candidate extraction unit 110 selects the plane point cloud that forms the candidate area and extracts the plane point cloud as follows.

A movement vector of the measurement vehicle is stored beforehand in the storage unit 190. The movement vector indicates a direction of a movement path.

The candidate extraction unit 110 calculates an angle that the movement vector of the measurement vehicle and the normal vector of the plane point cloud form for each plane point cloud. The angle calculated is called "relative angle".

The candidate extraction unit 110 selects a plane point cloud in which the relative angle is included in a prescribed range. The plane point cloud selected is the plane point cloud that forms the candidate area. The prescribed range is a range in which an angle is determined beforehand. Specifically, the prescribed range indicates around 0 degrees.

Returning to FIG. 7, step S112 will be described.

In step S112, the candidate extraction unit 110 calculates a three-dimensional plane area based on one or more three-dimensional coordinate values that one or more three-dimensional points included in the plane point cloud that forms the candidate area extracted.

The three-dimensional plane area calculated is "candidate area". When there are a plurality of plane point clouds, a plurality of candidate areas are calculated.

The three-dimensional plane area is a rectangular three-dimensional area that specifies a planar range where the plane point cloud is positioned. The three-dimensional plane area, that is, the candidate area is represented by four three-dimensional coordinate values indicating four endpoints (vertices).

Next, details of a candidate image area calculation process (S120) will be described.

The geographic object recognition unit 120 calculates the group of candidate image areas for each image data 192.

Figure 9:
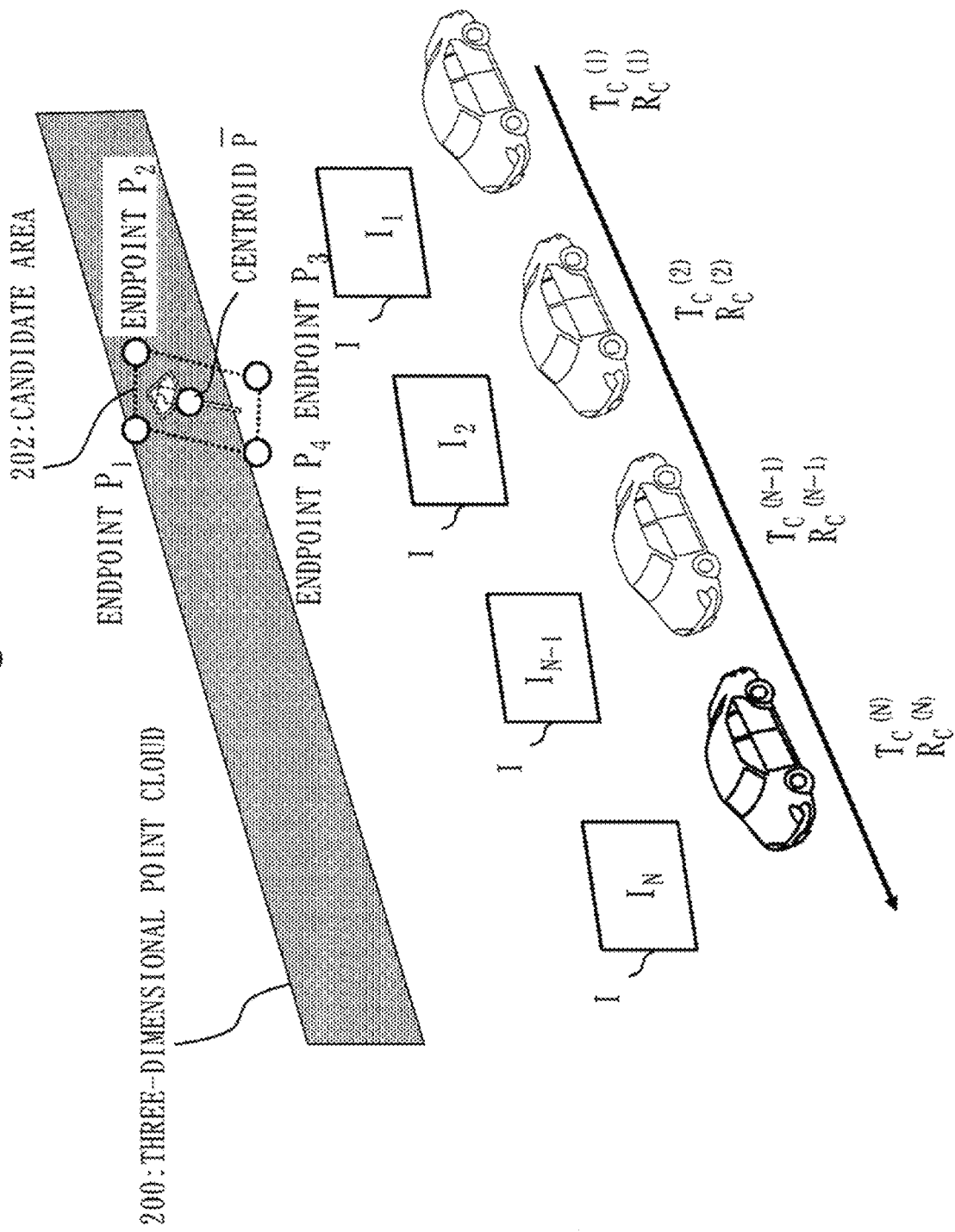
FIG. 9 is an explanatory diagram of information for calculating an image area corresponding to a candidate area 202 according to Embodiment 1.

Information for calculating a candidate image area corresponding to the candidate area 202 will be described based on FIG. 9.

By MMS, in addition to a three-dimensional point cloud 200 relating to surroundings of the measurement vehicle, N number of images (Ii to IN) are obtained by N times of photographing performed at regular time intervals. Each image is called "frame". Furthermore, the position and the posture of the measurement vehicle at photographing time is recorded by MMS.

The candidate area 202 is represented by four endpoints (P1 to P4).

"P⁻" is a centroid of the candidate area 202.

"$T_C^{(i)}$" represents a position of the camera mounted on the measurement vehicle at a time of photographing when image of i th frame is obtained.

"$R_C^{(i)}$" represents a posture of the camera mounted on the measurement vehicle at a time of photographing when image of $I_i$ of i th frame is obtained.

Camera position Tc is calculated by correcting the position of the measurement vehicle found by GPS positioning based on a positional relationship (offset) between the GPS receiver and the camera.

Posture $R_C$ of the camera is measured by a gyroscope mounted on the measurement vehicle. The gyroscope is included in the IMU mounted on the measurement vehicle.

A procedure of the candidate image area calculation process (S120) will be described based on FIG. 10.

In step S121, the geographic object recognition unit 120 selects one unselected candidate area.

In step S122, the geographic object recognition unit 120 selects one or more images that show the candidate area selected.

One or more images selected are called "group of target images".

The geographic object recognition unit 120 selects the group of target images as follows.

First, the geographic object recognition unit 120 calculates the centroid P⁻ of the candidate area based on the four three-dimensional coordinate values indicating the four endpoints (P1 to P4) of the candidate area.

Next, the geographic object recognition unit 120 selects set X of the camera position $T_C$ where a distance to the centroid P⁻ of the candidate area is less than or equal to threshold d. The set X can be represented by formula (1).

[Numerical Formula 1]

$$X=\{i\,|\,\|T_C^{(i)}-\overline{P}\|\leq d\} \quad (1)$$

Then, the geographic object recognition unit 120 selects, for each camera position $T_C$ included in the set X, the image data 192 obtained by photographing at the camera position $T_C$.

Thus, one or more pieces of image data 192 are selected. One or more image $I_k$'s that one or more pieces of image data 192 selected represent are a group of target images formed of one or more target image I's.

In step S123, the geographic object recognition unit 120 calculates, for each target image I, the candidate image area corresponding to the candidate area.

Specifically, the geographic object recognition unit 120 specifies four pixels where the four endpoints (P1 to P4) of the candidate area in the target image I are projected. That is, the geographic object recognition unit 120 calculates four two-dimensional coordinate values that indicate the four pixels. Each of the four pixels is the pixel to which the endpoint (P1 to P4) of the candidate area corresponds.

Hereinafter, a method to specify pixel m where endpoint Mw is projected will be described. For example, the endpoint $M_w$ is an endpoint (P1 to P4), and the pixel m is the pixel to which the endpoint (P1 to P4) of the candidate area correspond.

A three-dimensional coordinate value of the endpoint Mw is represented as $[X,Y,Z]^T$.

A two-dimensional coordinate value of the pixel m corresponding to the endpoint Mw in image $I_i$ of i th frame is represented as $[u,v]^T$.

A relationship between these coordinate values is specified by a camera model. A specific example of the camera model is a pinhole camera model. The pinhole camera model is a model that is commonly used. The relationship between the three-dimensional coordinate value of the endpoint Mw and the two-dimensional coordinate value of the pixel m, however, may be specified by a model other than the pinhole camera model.

When the endpoint Mw in the three-dimensional space is given, endpoint Mc in a camera coordinate system is represented by formula (2). The camera coordinate system is a three-dimensional coordinate system having the camera at a time of photographing in a center.

The camera posture $R_C$ is a matrix of 3×3 representing a rotation.

The camera position $T_C$ is a vector of 3×1 representing a translation.

[Numerical Formula 2]

$$M_C = R_C M_w + T_C \qquad (2)$$

In image $I_i$, a two-dimensional coordinate value of pixel $m_n$ where the endpoint Mc is projected is calculated by calculating formula (3).

Since various types of cameras that are different in characteristics such as a focal length (zoom ratio) and the like are handled in a unified manner, it will be assumed that the camera used for photographing image $I_i$ is a normalized camera. The normalized camera is a virtual camera where the focal length is equivalent to 1 pixel.

[Numerical Formula 3]

$$m_n = \begin{bmatrix} M_{CX}/M_{CZ} \\ M_{CY}/M_{CZ} \end{bmatrix} = \begin{bmatrix} x' \\ y' \end{bmatrix} \qquad (3)$$

Furthermore, a two-dimensional coordinate value of pixel $m_d$ after taking a lens distortion into consideration, is calculated by calculating formula (4).

Assume, however, that "$r'^2 = x'^2 + y'^2$" is valid.

[Numerical Formula 4]

$$m_d = \left(1 + k_1 r'^2 + k_2 r'^4 + k_3 r'^6\right) m_n + \begin{bmatrix} p_1(r'^2 + 2x'^2) + 2p_2 x' y' + a_1 x' + a_2 y' \\ p_2(r'^2 + 2y'^2) + 2p_1 x' y' - a_1 y' \end{bmatrix} \qquad (4)$$

And, by calculating formula (5), the two-dimensional coordinate value of the pixel m is calculated.

"A" means an internal parameter of the camera.

"$a_x$" means a focal length in a horizontal direction.

"$a_y$" means a focal length in a vertical direction.

[$u_0, v_0$] means a two-dimensional coordinate value of a point of intersection of an optical axis of the camera and an image plane.

[Numerical Formula 5]

$$\tilde{m} = A \widetilde{m_d} \qquad (5)$$

$$A = \begin{bmatrix} \alpha_x & 0 & u_0 \\ 0 & \alpha_y & v_0 \\ 0 & 0 & 1 \end{bmatrix}$$

Internal parameter A is determined by performing calibration of the camera (calibration) in advance. The internal parameter A is disclosed in Non-Patent Literature 1.

In step S124, the geographic object recognition unit 120 verifies whether or not there is a candidate area that was not selected (an unselected candidate area) in step S121.

When there is an unselected candidate area, the process proceeds to step S121.

When there is no unselected candidate area, the process ends.

Figure 11:
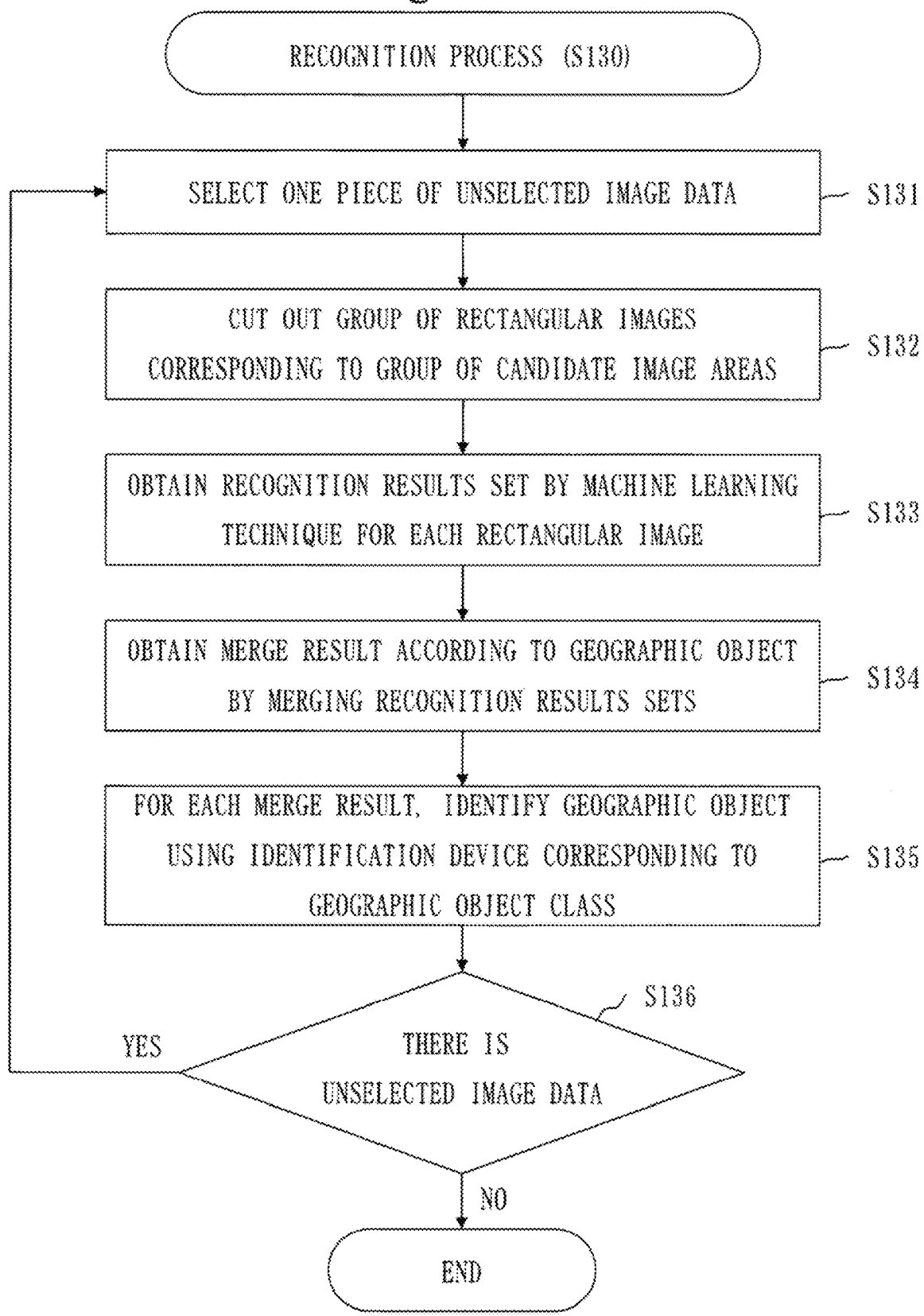
FIG. 11 is a flowchart of a recognition process (S130) according to Embodiment 1.

A procedure of a recognition process (S130) will be described based on FIG. 11.

In step S131, the geographic object recognition unit 120 selects one piece of unselected image data 192.

Step S132 to step S135 are executed for a group of candidate image areas of the image data 192 selected in step S131.

In step S132, the geographic object recognition unit 120 cuts out a group of rectangular images corresponding to the group of candidate image areas from the image that the image data 192 selected represents.

Specifically, for each candidate image area, the geographic object recognition unit 120 cuts out a rectangular area including the candidate image area from the image. The rectangular area cut out is called "rectangular image".

Figure 12:
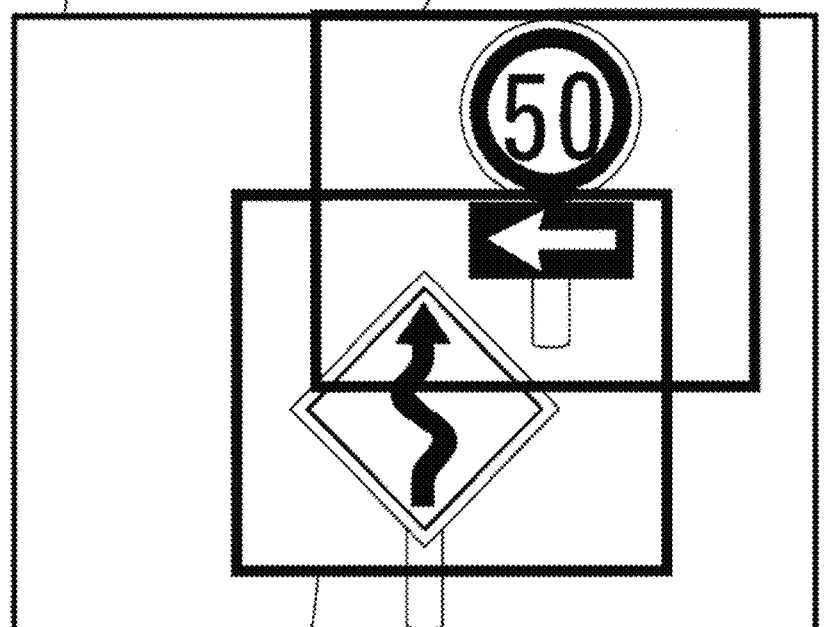
FIG. 12 is a diagram illustrating the image 210 according to Embodiment 1.

In FIG. 12, two rectangular images (212A, 212B) are cut out from the image 210. A road sign is shown in each rectangular image 212.

A part of the rectangular image 212A overlaps with a part of the rectangular image 212B.

Returning to FIG. 11, the description will continue from step S133.

In step S133, the geographic object recognition unit 120 obtains a recognition results set by a machine learning technique for each rectangular image.

This machine learning technique is a type of image processing. A specific example of machine learning is deep learning.

The recognition results set is one or more recognition results.

The recognition result includes the geographic object image area, a geographic object class, and class reliability.

The geographic object class indicates a type of the geographic object. There are four types to the geographic object class: an information sign, a warning sign (and a warning instruction), a regulatory sign, and a supplemental sign.

The class reliability is reliability of the geographic object class.

Figure 13:
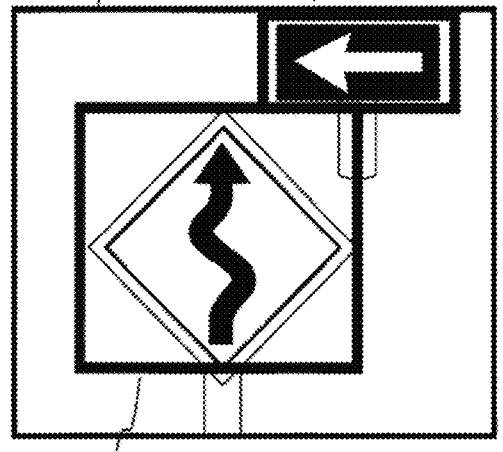
FIG. 13 is a diagram illustrating a rectangular image 212A according to Embodiment 1.

In FIG. 13, two recognition results corresponding to two road signs (213A, 213B) are obtained based on the rectangular image 212A.

Figure 14:
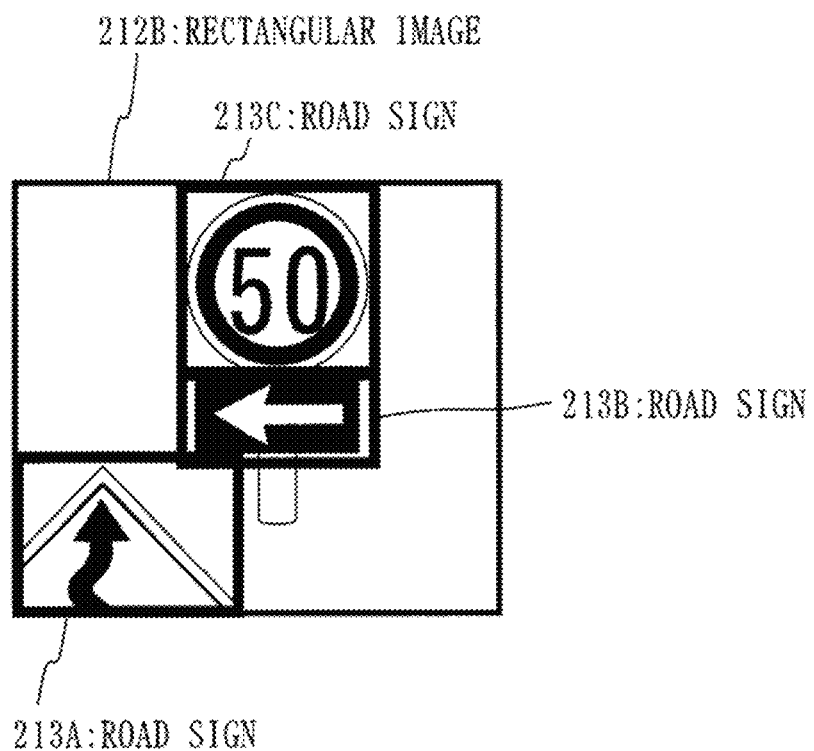
FIG. 14 is a diagram illustrating a rectangular image 212B according to Embodiment 1.

In FIG. 14, three recognition results corresponding to three road signs (213A to 213C) are obtained based on the rectangular image 212B.

That is, two recognition results regarding the road sign 213A, two recognition results regarding the road sign 213B, and one recognition result regarding the road sign 213C are obtained based on the rectangular image 212A and the rectangular image 212B.

Returning to FIG. 11, the description will continue from step S134.

In step S134, the geographic object recognition unit 120 obtains a merge result according to geographic object by merging the recognition results sets.

The merge result is a result obtained by merging a plurality of recognition results.

The geographic object recognition unit 120 obtains the merge result as follows.

First, the geographic object recognition unit 120 divides the recognition results sets into groups based on the geographic object image area of each recognition result. Specifically, the geographic object recognition unit 120 collects into one group, a plurality of recognition results of which overlap ratios of the geographic object image areas are exceeding a threshold.

Then, the geographic object recognition unit 120 generates a merge result for each recognition results group by merging recognition results groups.

Specifically, the geographic object recognition unit 120 generates the merge result as follows.

The geographic object recognition unit 120 calculates one geographic object image area by merging the plurality of geographic object image areas that the recognition results group indicates. Then, the geographic object recognition unit 120 sets the geographic object image area calculated in the merge result.

When a plurality of geographic object classes that the recognition results group indicates indicate a same type, the geographic object recognition unit 120 sets the geographic object class indicating that type in the merge result.

When the plurality of geographic object classes that the recognition results group indicates indicate different types, the geographic object recognition unit 120 selects a geographic object class that is highest in class reliability. Then, the geographic object recognition unit 120 sets the geographic object class selected in the merge result.

In step S135, the geographic object recognition unit 120, for each merge result, identifies the geographic object using an identification device corresponding to the geographic object class indicated in the merge result.

Figure 15:
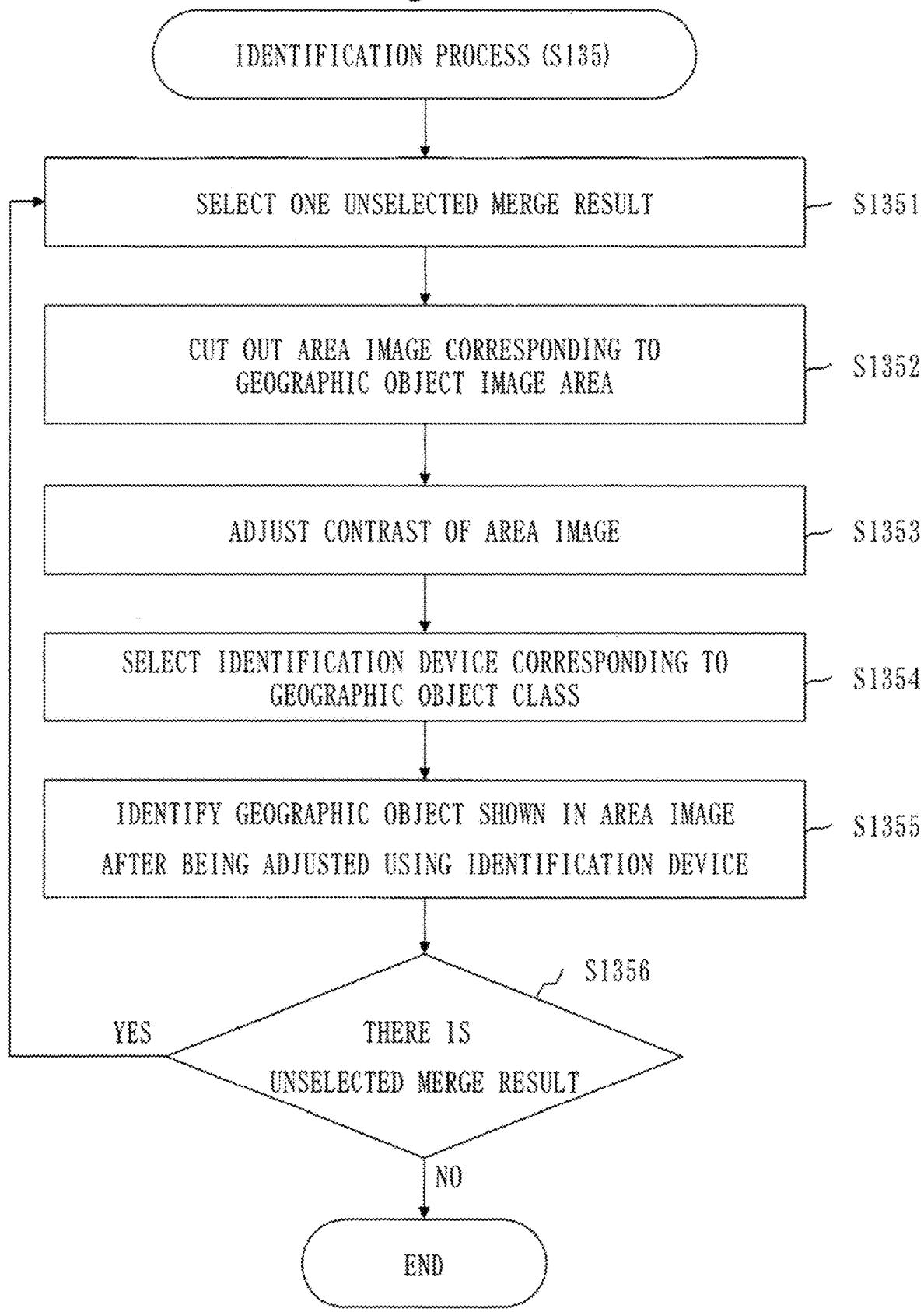
FIG. 15 is a flowchart of an identification process (S135) according to Embodiment 1.

A procedure of an identification process (S135) will be described based on FIG. 15.

In step S1351, the geographic object recognition unit 120 selects one unselected merge result.

In step S1352, the geographic object recognition unit 120 cuts out the geographic object image area indicated in the merge result selected from the image. The geographic object image area cut out is called "area image".

In step S1353, the geographic object recognition unit 120 adjusts contrast of the area image.

Specifically, the geographic object recognition unit 120 performs a gamma correction on the area image. Thus, it will be possible to identify a geographic object that is difficult to identify because of shade of a tree.

In FIG. 16, an area image 214B is obtained by performing the gamma correction on an area image 214A.

It is possible to identify in the area image 214B, a road sign that is difficult to identify in the area image 214A.

Returning to FIG. 15, the description will continue from step S1354.

In step S1354, the geographic object recognition unit 120 selects from a plurality of identification devices corresponding to a plurality of types of road signs, the identification device corresponding to the geographic object class indicated in the merge result. The plurality of identification devices are prepared beforehand.

In step S1355, the geographic object recognition unit 120 identifies using the identification device selected, the geographic object shown in the area image after being adjusted.

Identification methods differ between the information sign and a road sign other than the information sign.

First, a method to identify the road sign other than the information sign will be described.

A convolutional neural network (CNN: Convolutional Neural Network) formed of a plurality of layers is used as the identification device.

Figure 17:
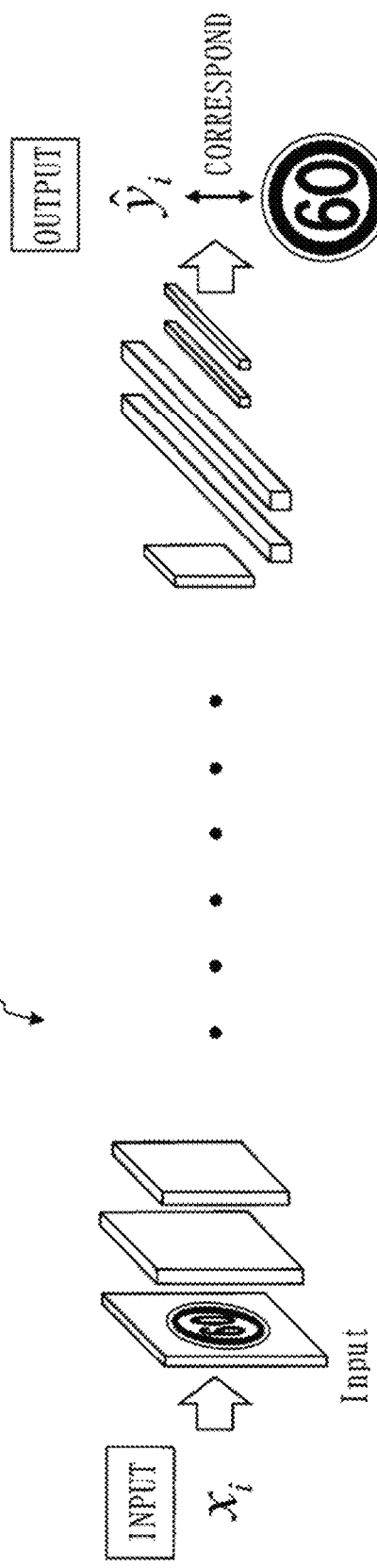
FIG. 17 is a schematic diagram of a convolutional neural network 230 according to Embodiment 1.

FIG. 17 illustrates a schematic diagram of a convolutional neural network 230. The convolutional neural network 230 is a convolutional neural network formed of a plurality of layers.

The convolutional neural network 230 is disclosed in Non-Patent Literature 2.

A data set for learning is created for each type of the road sign (warning sign (and instruction), regulatory sign, supplemental sign). And, each data set is made to learn the CNN.

That is, although the three CNN have the same network structure, the three CNN are different from each other in weight parameter of the network.

Next, a method to identify an information sign will be described.

Even of a same type, various designs of the information sign exist.

As for a design not in the data set for learning, an identification ratio by the CNN will worsen.

Figure 18:
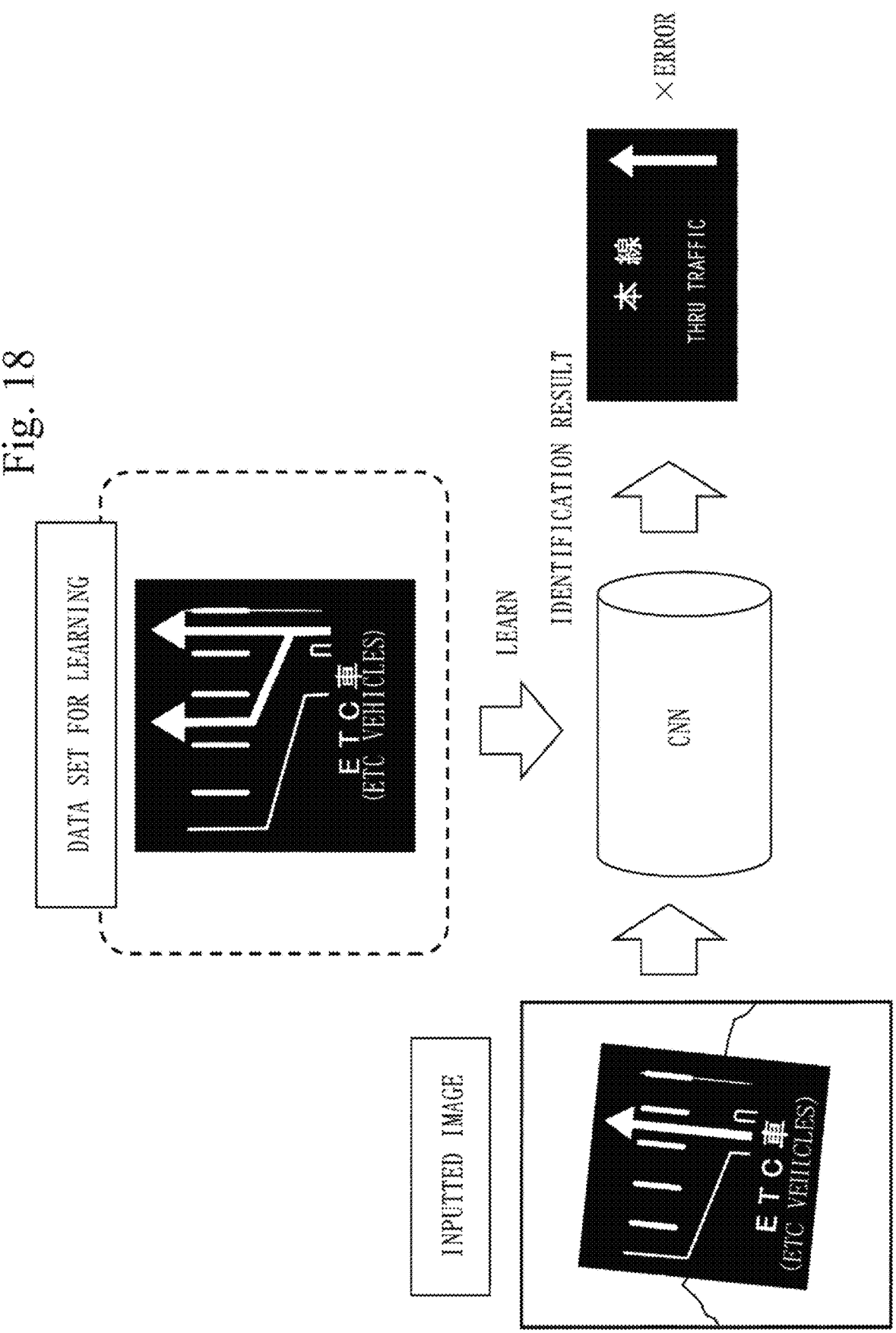
FIG. 18 is a diagram illustrating an identification error made by a CNN according to Embodiment 1.

In FIG. 18, a same design as the information sign shown in an inputted image is not included in the data set for learning. In this case, an information sign that is incorrect will be identified by the CNN.

Consequently, with regard to the information sign, a characteristic that is common among a plurality of designs that are different in shape, color, character, and the like will be focused on.

First, the geographic object recognition unit 120 detects a characteristic of the geographic object from the area image. Methods such as image recognition, object detection, character recognition, and the like are used for detecting the characteristic.

And, the geographic object recognition unit 120 identifies the information sign based on the characteristic detected as follows.

First, the geographic object recognition unit 120 verifies whether a characteristic exists or not for each type of the characteristic. Existence or non-existence of each type of the characteristic is represented by two values (0 or 1). Information that represents the existence or non-existence of each type of the characteristic is called "characteristic vector".

Then, the geographic object recognition unit 120 selects from information sign characteristic data, an information sign that has a high degree of similarity with the characteristic vector. The information sign characteristic data indicates the characteristic vector for each information sign.

Figure 19:
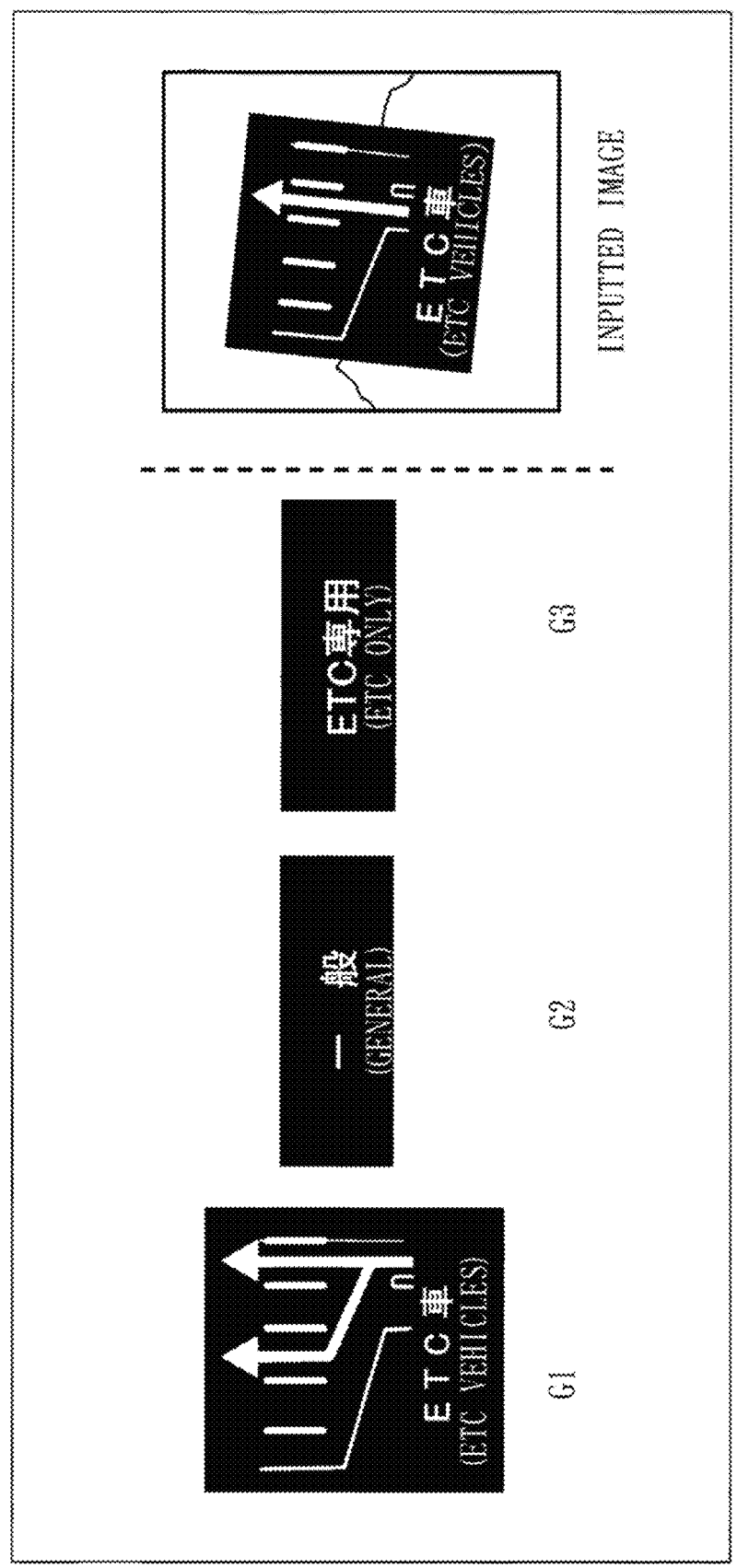
FIG. 19 is a diagram illustrating information signs (G1 to G3) and an inputted image according to Embodiment 1.

Three information signs (G1 to G3) and an inputted image are illustrated in FIG. 19. The inputted image is equivalent to the area image.

Information sign characteristic data 240 and an input characteristic vector 241 are illustrated in FIG. 20.

The information sign characteristic data 240 indicates a characteristic vector of each of the three information signs (G1 to G3).

The input characteristic vector 241 is a characteristic vector of the information sign shown in the inputted image.

The characteristic vector that is high in degree of similarity with the input characteristic vector 241 is the characteristic vector of information sign G1. Consequently, an identification result of the information sign shown in the inputted image becomes information sign G1.

A cosine similarity is used as a degree of similarity of two characteristic vectors. The cosine similarity is an example of an evaluation index for measuring the degree of similarity.

A cosine similarity between characteristic vector x of a first information sign and characteristic vector y of a second information sign is found by formula (6).

[Numerical Formula 6]

$$\cos(\text{information sign 1, information sign 2}) = \frac{x \cdot y}{|x||y|} \quad (6)$$

A cosine similarity between the input characteristic vector 241 and the characteristic vector of information sign G1 is "1.0".

A cosine similarity between the input characteristic vector 241 and the characteristic vector of information sign G2 is "0.24".

A cosine similarity between the input characteristic vector 241 and the characteristic vector of information sign G3 is "0.5".

Therefore, an identification result of the information sign shown in the inputted image becomes information sign G1.

In the example described above, the input characteristic vector 241 matched with the characteristic vector of information sign G1. Actually, however, since there are oversights in detection of characteristics or misdetection of characteristics, a situation where the input characteristic vector 241 not matching the characteristic vectors of any of the information signs can be considered. In such a case, an information sign corresponding to a characteristic vector with a highest cosine similarity is selected as an identification result.

Returning to FIG. 15, step S1356 will be described.

In step S1356, the geographic object recognition unit 120 verifies whether or not there is a merge result that was not selected (an unselected merge result) in step S1351.

When there is an unselected merge result, the process proceeds to step S1351.

When there is no unselected merge result, the process ends.

Returning to FIG. 11, step S136 will be described.

In step S136, the geographic object recognition unit 120 verifies whether or not there is image data that was not selected (unselected image data) in step S131.

When there is unselected image data, the process proceeds to step S131.

When there is no unselected image data, the process ends.

A procedure of a temporary area calculation process (S140) will be described based on FIG. 21.

In step S141, the position specification unit 130 selects one unselected geographic object image area.

In step S142, the position specification unit 130 selects a candidate area corresponding to the geographic object image area.

Then, the position specification unit 130 calculates a reference plane corresponding to the candidate area selected.

The reference plane is a plane including each endpoint of the candidate area in the three-dimensional space.

Specifically, the position specification unit 130 calculates an equation of the reference plane by plane fitting on the four endpoints of the candidate area. The equation of the reference plane is represented by a form, "aX+bY+cZ+d=0".

Description on the four the endpoints of the candidate area will be supplemented.

In automated mapping, processes from (1) to (3) below are performed on a road sign area point detected from a point cloud.

(1) Specify an approximate area in an image by associating the point cloud with the image.
(2) Specify an exact area in the image.
(3) Calculate by associating the image with the point cloud, a three-dimensional coordinate value of pixels on four corners of a (rectangular) area that is specified.

Therefore, for the pixel that is to be an input for associating the image with the point cloud, the road sign area point that corresponds is known.

In step S143, the position specification unit 130 calculates a sight line vector for each endpoint of the geographic object image area.

The sight line vector is a vector from a photographing point to the endpoint of the geographic object image area in the image plane. The image plane is a three-dimensional plane corresponding to the image including the geographic object image area.

The position specification unit 130 calculates a sight line vector (Pp to Pc) corresponding to the endpoint of the geographic object image area as follows.

First, the position specification unit 130 finds position Pc that is a camera center in a laser coordinate system. Specifically, the position specification unit 130 finds the position Pc that is the camera center in the laser coordinate system by calculating formula (7).

Formula (7) is a formula for converting the point Mc of the camera coordinate system to the point Mw of the laser coordinate system.

[Numerical Formula 7]

$$M_W = R_C^{-1}(M_C - T_C) \quad (7)$$

Next, the position specification unit 130 finds position Pp of a pixel in the laser coordinate system as follows.

Specifically, the position specification unit 130 finds point $m_n$ in a normalized camera coordinate system. Then, the position specification unit 130 obtains the position PP in the laser coordinate system by converting the point $m_n$ to the laser coordinate system using formula (7) described above.

The point $m_n$ can be represented by formula (8).

[Numerical Formula 8]

$$m_n = \begin{bmatrix} (u - u_0)/\alpha_x \\ (v - v_0)/\alpha_y \\ 1 \end{bmatrix} \quad (8)$$

Then, the position specification unit 130 calculates the sight line vector ($P_P$ to $P_C$).

In step S144, the position specification unit 130 calculates a three-dimensional coordinate value of a point of intersection of the sight line vector and the reference plane for each endpoint of the geographic object image area.

In step S145, the position specification unit 130 verifies whether or not there is a geographic object image area that was not selected (an unselected geographic object image area) in step S141.

When there is an unselected geographic object image area, the process proceeds to step S141.

When there is no unselected geographic object image area, the process ends.

Figure 22:
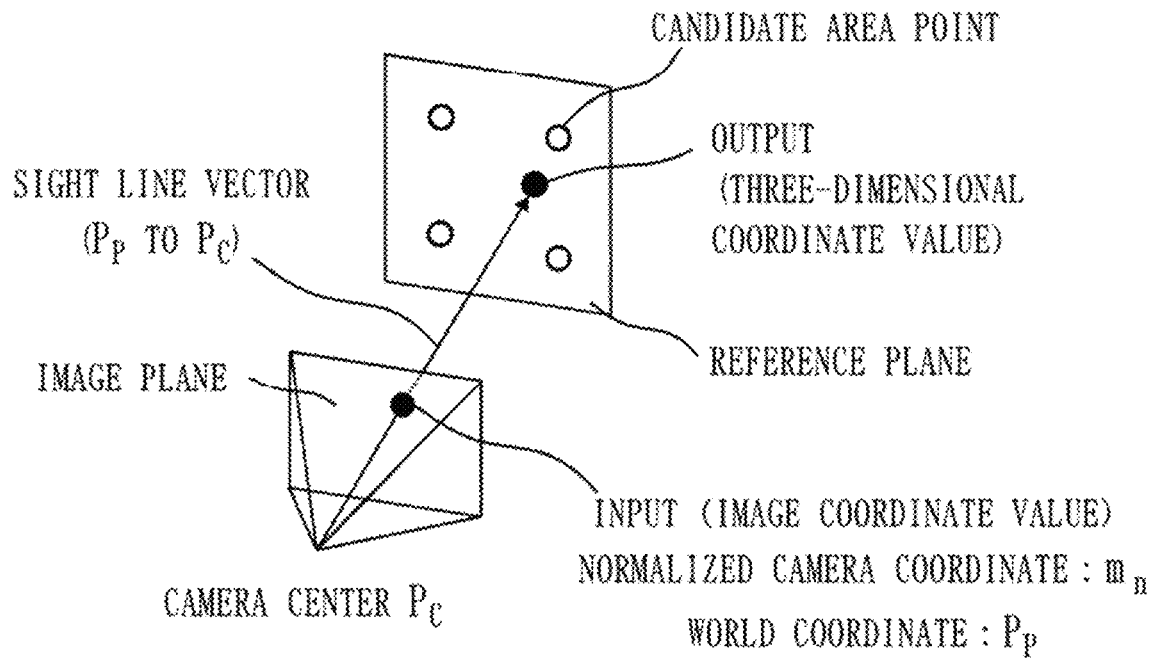
FIG. 22 is a diagram illustrating a state of conversion from an image coordinate value to a three-dimensional coordinate value according to Embodiment 1.

A state of conversion from an image coordinate value to the three-dimensional coordinate value is illustrated in FIG. 22.

As illustrated in FIG. 22, the three-dimensional point (output) corresponding to the endpoint (input) of the geographic object image area is equivalent to the point of intersection of the sight line vector ($P_P$ to $P_C$) and the reference plane.

A procedure of a merging process (S150) will be described based on FIG. 23.

In step S151, the position specification unit 130 divides the group of temporary areas into clusters.

Specifically, the position specification unit 130 collects into one cluster, one or more temporary areas that are close.

For example, the position specification unit 130 determines one or more temporary areas that are close based on a centroid of each temporary area. When a distance between a centroid of a first temporary area and a centroid of a second temporary area is less than or equal to the threshold, the first temporary area and the second temporary area are close to each other.

In step S152, the position specification unit 130 calculates, for each cluster, the geographic object area by merging one or more temporary areas belonging to the cluster.

For example, the position specification unit 130, for four endpoints of each temporary area, calculates an average of the three-dimensional coordinate value for each endpoint. A three-dimensional area represented by four mean values calculated is a geographic object area obtained by merging the temporary areas.

In step S153, the position specification unit 130 determines, for each cluster, an identification result by merging one or more identification results corresponding to one or more temporary areas belonging to the cluster.

Specifically, the position specification unit 130 performs a voting process on one or more identification results and adopts an identification result with most votes. In the voting process, it is preferable for the position specification unit 130 to give each identification result a weighting. For example, a weighting is proportional to class reliability of the identification result and is in inverse proportion to a distance from a geographic object area corresponding to the identification result to the camera.

Effect of Embodiment 1

By Embodiment 1, it will be possible to realize highly accurate mapping based on point cloud data and the image data obtained by MMS.

Since both the point cloud data and the image data are utilized, the geographic object can be recognized more accurately.

Since candidate areas are narrowed down using the point cloud data, searching for the geographic object in an entire area in the image will not be necessary. As a result, the mapping process is accelerated.

Since, not only the point cloud data but also the image data is used, the geographic object can be recognized more accurately.

Other Configurations

Because of the candidate extraction process (S110), processes that follow can be executed intended only for the candidate area in the image. Consequently, a calculation amount in data processing can be reduced compared with when the processes that follow are executed intended for the entire area in the image. As a result, processing time is shortened.

When, however, the calculation amount in the data processing is not necessary to be reduced, the candidate extraction process (S110) can be omitted. In this case, the processes that follow are executed intended for the entire area in the image.

Embodiment 2

With regard to a mode of detecting a road marking marked a road surface, mainly points that differ from those of Embodiment 1 will be described based on FIG. 24 to FIG. 27.

The road marking has two or more characters that are being separated.

The road marking is an example of a geographic object having two or more elements that are being separated.

The candidate image area and the geographic object image area are equivalent to two or more element image areas corresponding to the two or more elements. The element image area is an area in the image where the elements are shown.

The candidate area is equivalent to an element area. The element area is a three-dimensional area corresponding to the element image area.

The group of temporary areas is equivalent to the two or more element areas.

Description of Configuration

Figure 2:
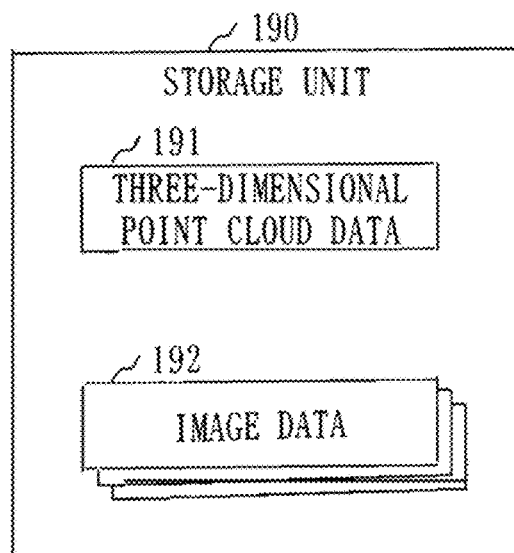
FIG. 2 is a configuration diagram of a storage unit 190 according to Embodiment 1.

A configuration of the geographic object detection apparatus 100 is the same as the configuration of that in Embodiment 1 (refer to FIG. 1 and FIG. 2).

Description of Operation

Figure 3:
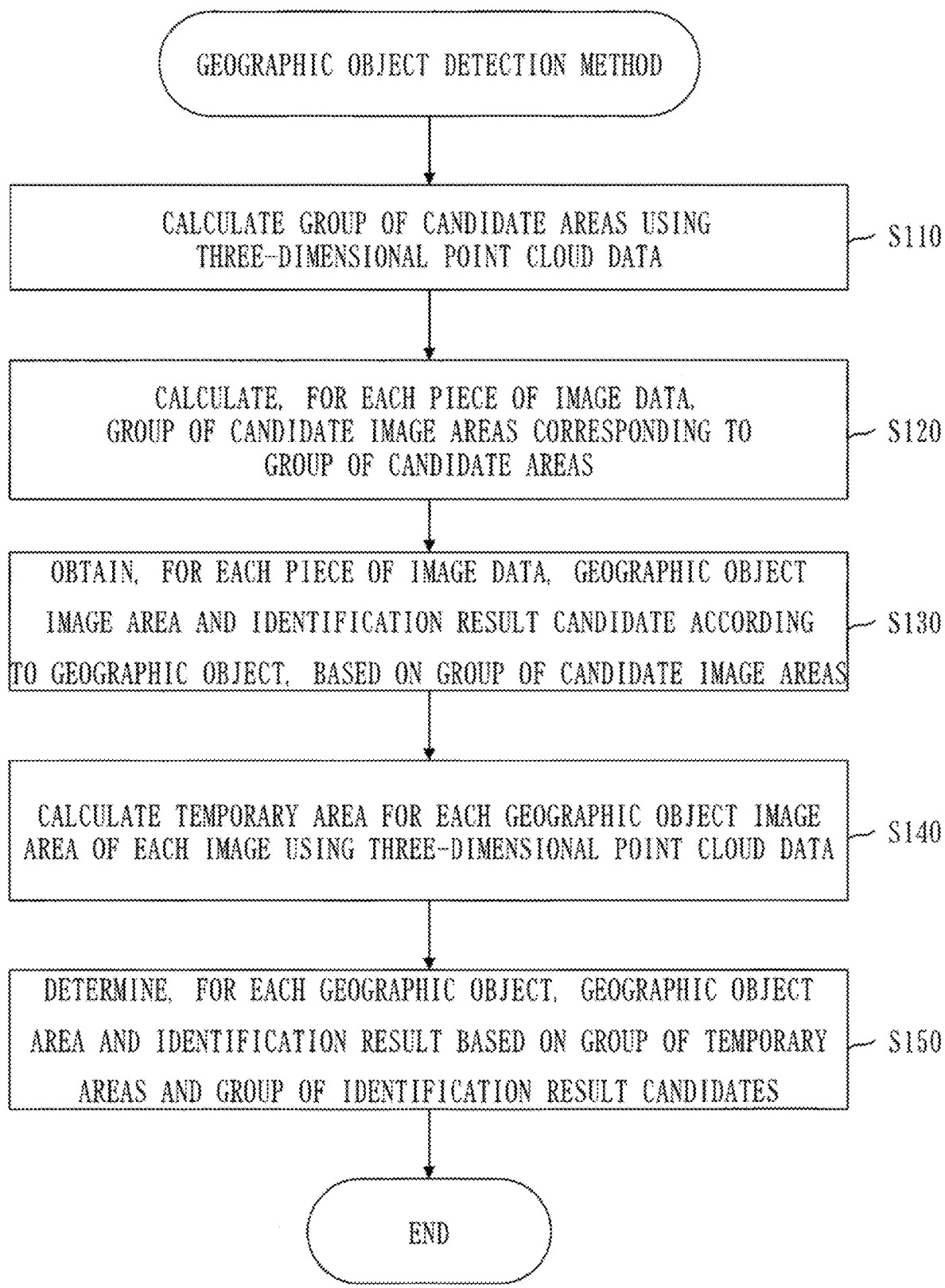
FIG. 3 is a flowchart of a geographic object detection method according to Embodiment 1.

A summary of the geographic object detection method is the same as the summary of that in Embodiment 1 (refer to FIG. 3).

Figure 24:
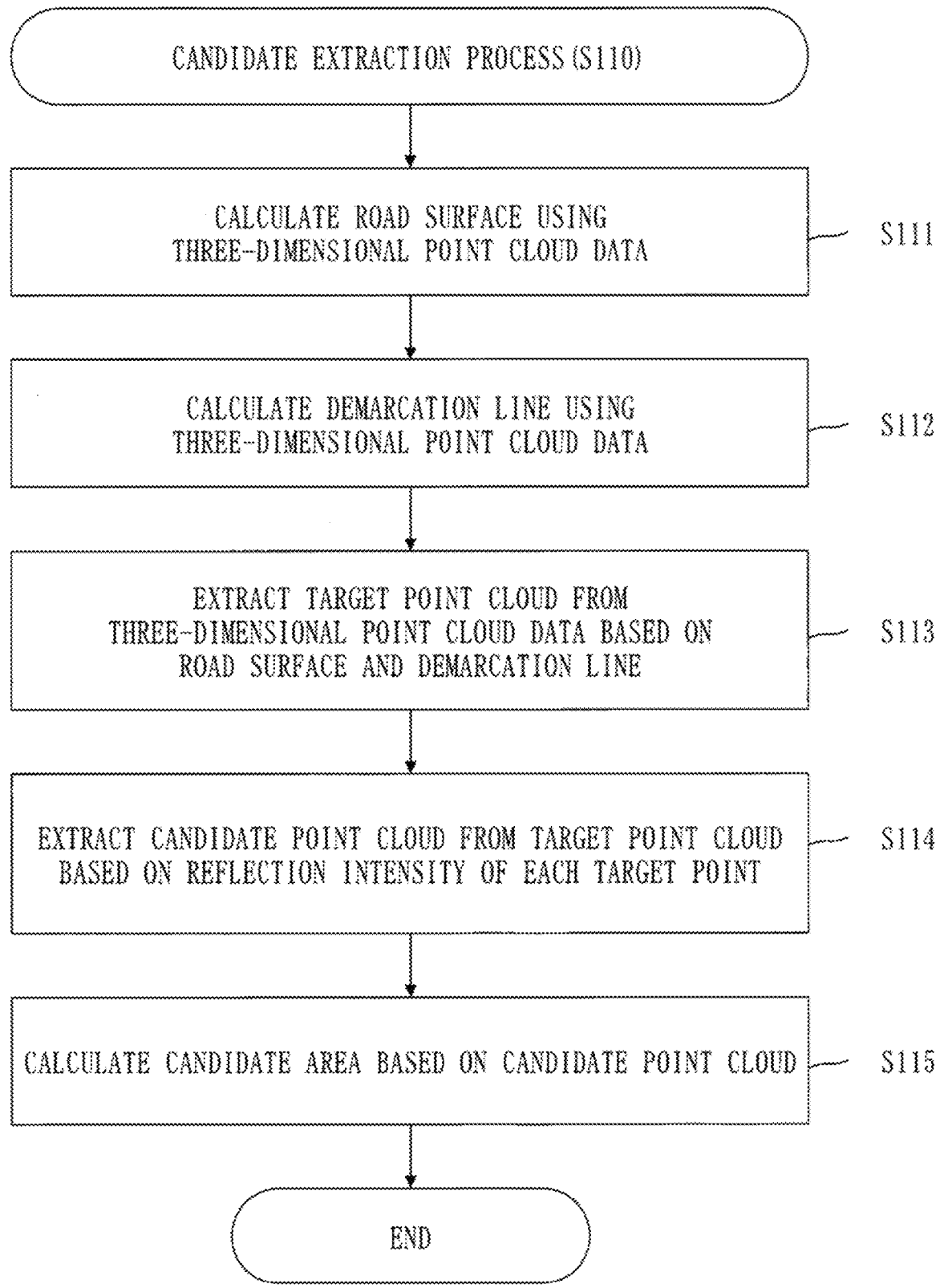
FIG. 24 is a flowchart of a candidate extraction process (S110) according to Embodiment 2.

A procedure of a candidate extraction process (S110) will be described based on FIG. 24.

In step S111, the candidate extraction unit 110 extracts a road surface point cloud from the three-dimensional point cloud data 191.

The road surface point cloud is a plurality of three-dimensional points representing a plurality of points positioned on the road surface.

The candidate extraction unit 110 extracts the road surface point cloud as follows.

First, the candidate extraction unit 110 calculates an altitude of the road surface. For example, when a position of the IMU mounted on the measurement vehicle is to be handled as a standard position of the measurement vehicle, the candidate extraction unit 110 calculates the altitude of the road surface by subtracting, from altitude of the measurement vehicle, height of the IMU from a road.

Then, the candidate extraction unit 110 extracts the road surface point cloud from the three-dimensional point cloud data 191 based on the altitude of the road surface. For example, the candidate extraction unit 110 extracts a plurality of three-dimensional points of which difference in altitude between the road surface is less than or equal to the threshold.

In step S112, the candidate extraction unit 110 extracts a demarcation line point cloud from the three-dimensional point cloud data 191.

The demarcation line point cloud is a plurality of three-dimensional points that represent a plurality of points positioned on a demarcation line.

The candidate extraction unit 110 extracts the demarcation line point cloud as follows.

First, the candidate extraction unit 110 extracts, from the three-dimensional point cloud data 191, a three-dimensional point cloud of which reflection intensity is more than or equal to the threshold.

Then, the candidate extraction unit 110 extracts from the three-dimensional point cloud extracted, a plurality of three-dimensional points that line along a driving track of the measurement vehicle. The plurality of three-dimensional points extracted are the demarcation line point cloud.

The candidate extraction unit 110, however, may extract the demarcation line point cloud by a technique other than what is described above.

In step S113, the candidate extraction unit 110 extracts the target point cloud from the road surface point cloud based on the demarcation line point cloud.

The target point cloud is a remaining three-dimensional point cloud after the demarcation line point cloud is removed from the road surface point cloud.

Specifically, the candidate extraction unit 110 extracts a three-dimensional point cloud of which a distance from the demarcation line is more than or equal to the threshold. The demarcation line is calculated based on the three-dimensional coordinate value of each three-dimensional point of the demarcation line point cloud.

In step S114, the candidate extraction unit 110 extracts a candidate point cloud from the target point cloud based on reflection intensity of each target point and on three-dimensional coordinate value of each target point.

The candidate point cloud is two or more three-dimensional points positioned on a character part of the road marking.

Specifically, the candidate extraction unit 110 extracts the candidate point cloud as follows.

First, the candidate extraction unit 110 extracts from the target point cloud, the three-dimensional point cloud of which the reflection intensity is more than or equal to the threshold.

Next, the candidate extraction unit 110 clusters the three-dimensional point cloud extracted based on the three-dimensional coordinate value of each three-dimensional point. Thus, one or more clusters are obtained. Each cluster includes the plurality of three-dimensional points, and the plurality of three-dimensional points are positioned in an area in the vicinity. The area in the vicinity is a three-dimensional area having a size determined beforehand.

Then, the candidate extraction unit 110 selects a cluster including three-dimensional points in numbers more than or equal to the threshold. The cluster selected is the candidate point cloud.

In step S115, the candidate extraction unit 110 calculates a candidate area based on the candidate point cloud.

The candidate extraction unit 110 calculates the candidate area as follows.

First, the candidate extraction unit 110, for each candidate point cloud, calculates a rectangular area where the candidate point cloud is positioned based on a three-dimensional coordinate value of each candidate point.

Then, the candidate extraction unit 110 selects a rectangular area having a size within the prescribed range. The rectangular area selected is the candidate area.

The candidate area is calculated for each character included in the road marking by the candidate extraction process (S110).

Figure 10:
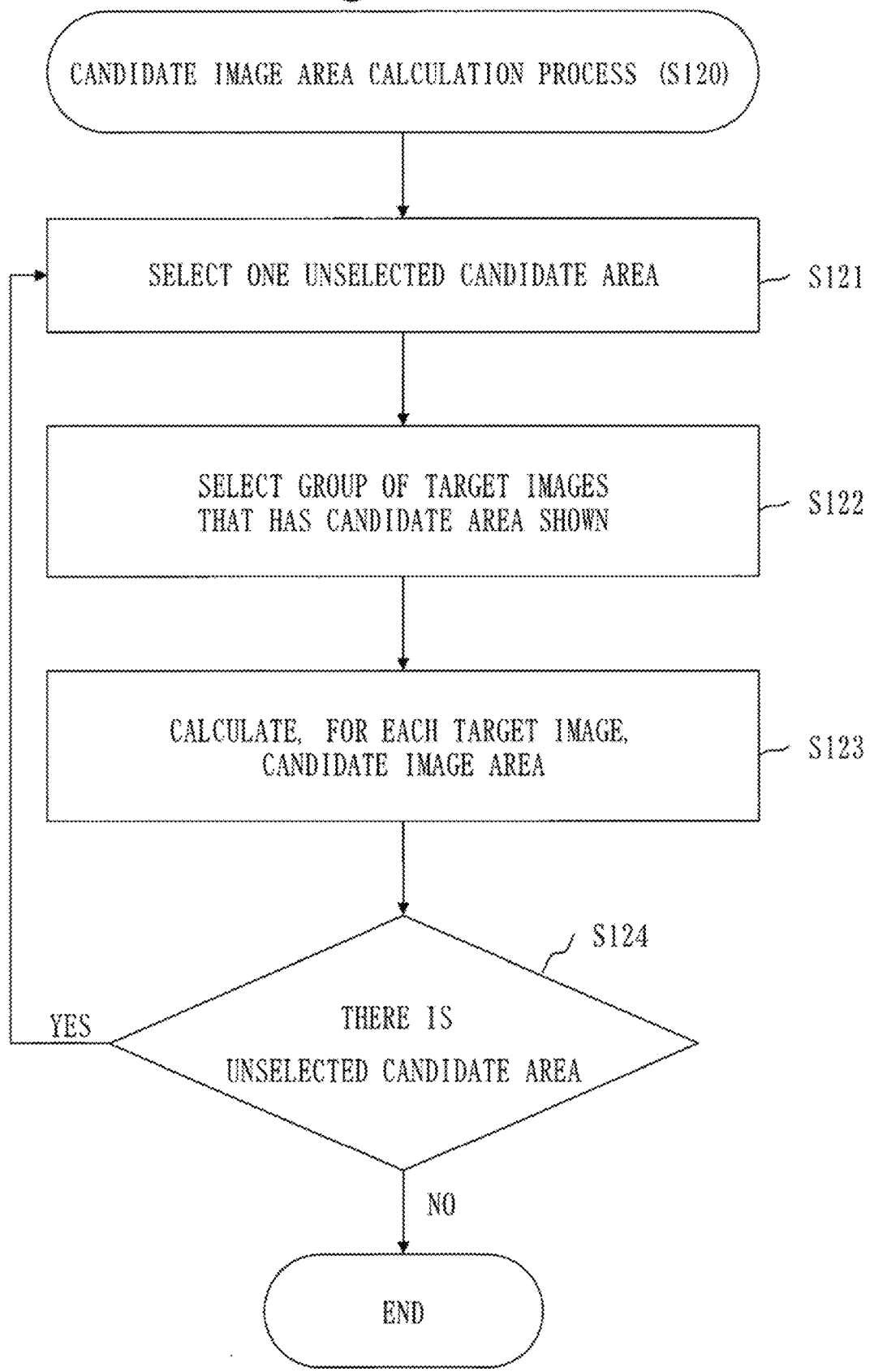
FIG. 10 is a flowchart of a candidate image area calculation process (S120) according to Embodiment 1.

A procedure of the candidate image area calculation process (S120) is the same as the procedure of that in Embodiment 1 (refer to FIG. 10).

Figure 25:
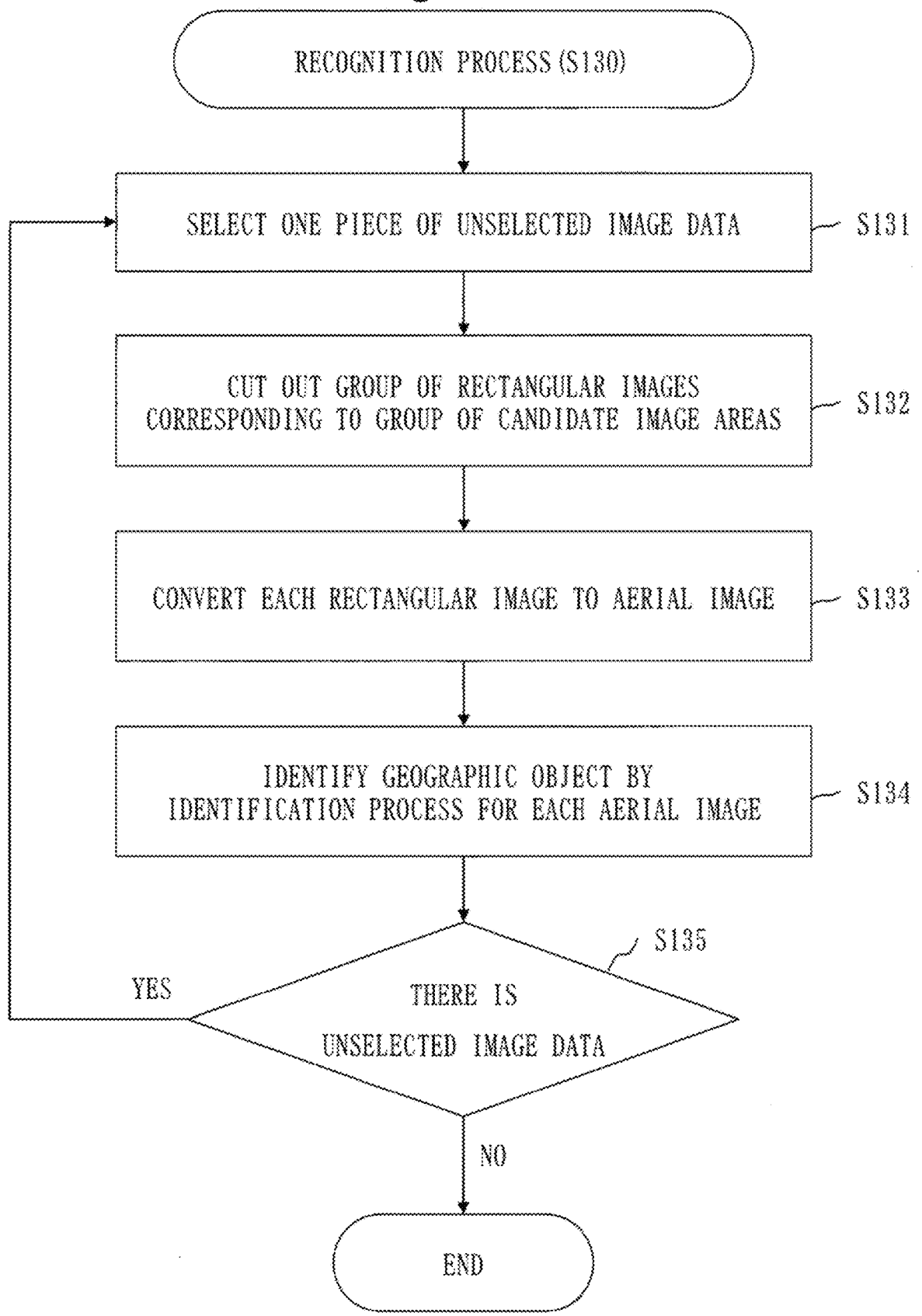
FIG. 25 is a flowchart of a recognition process (S130) according to Embodiment 2.

A procedure of a recognition process (S130) will be described based on FIG. 25.

In step S131, the geographic object recognition unit 120 selects one piece of unselected image data 192.

Step S132 to step S135 are executed for the group of candidate image areas of the image data 192 selected in step S131.

In step S132, the geographic object recognition unit 120 cuts out the group of rectangular images corresponding to the group of candidate image areas from the image that the image data 192 selected represents.

Specifically, for each candidate image area, the geographic object recognition unit 120 cuts out the rectangular area including the candidate image area from the image. The rectangular area cut out is called "rectangular image".

In step S133, the geographic object recognition unit 120 converts each rectangular image to an aerial image.

Conversion of the rectangular image to the aerial image is equivalent to image viewpoint conversion.

The geographic object recognition unit 120 performs the conversion as follows.

First, the geographic object recognition unit 120 calculates a conversion matrix based on a two-dimensional coordinate value of each of four vertices of the rectangular image and a two-dimensional coordinate value of each of four vertices of the aerial image.

Conversion matrix M satisfies a relationship in formula (9).

$(x_i, y_i)$ is the two-dimensional coordinate value of each of the four vertices before the conversion (the rectangular image).

$(x'_i, y'_i)$ is the two-dimensional coordinate value of each of the four vertices after the conversion (the aerial image).

"$t_i$" is a parameter for scaling which is in accordance with the conversion.

[Numerical Formula 9]

$$\begin{bmatrix} t_i x'_i \\ t_i y'_i \\ t_i \end{bmatrix} = M \cdot \begin{bmatrix} x_i \\ y_i \\ 1 \end{bmatrix} (i = 0, 1, 2, 3) \quad (9)$$

Then, the geographic object recognition unit 120 finds a pixel of the aerial image corresponding to each pixel of the rectangular image using the conversion matrix.

A two-dimensional coordinate value $(u_i, v_i)$ of the pixel after the conversion (the aerial image) is calculated by calculating formula (10).

[Numerical Formula 10]

$$\begin{bmatrix} u_i \\ v_i \\ 1 \end{bmatrix} = \frac{1}{t} \left( M \cdot \begin{bmatrix} x_i \\ y_i \\ 1 \end{bmatrix} \right) \quad (10)$$

Figure 26:
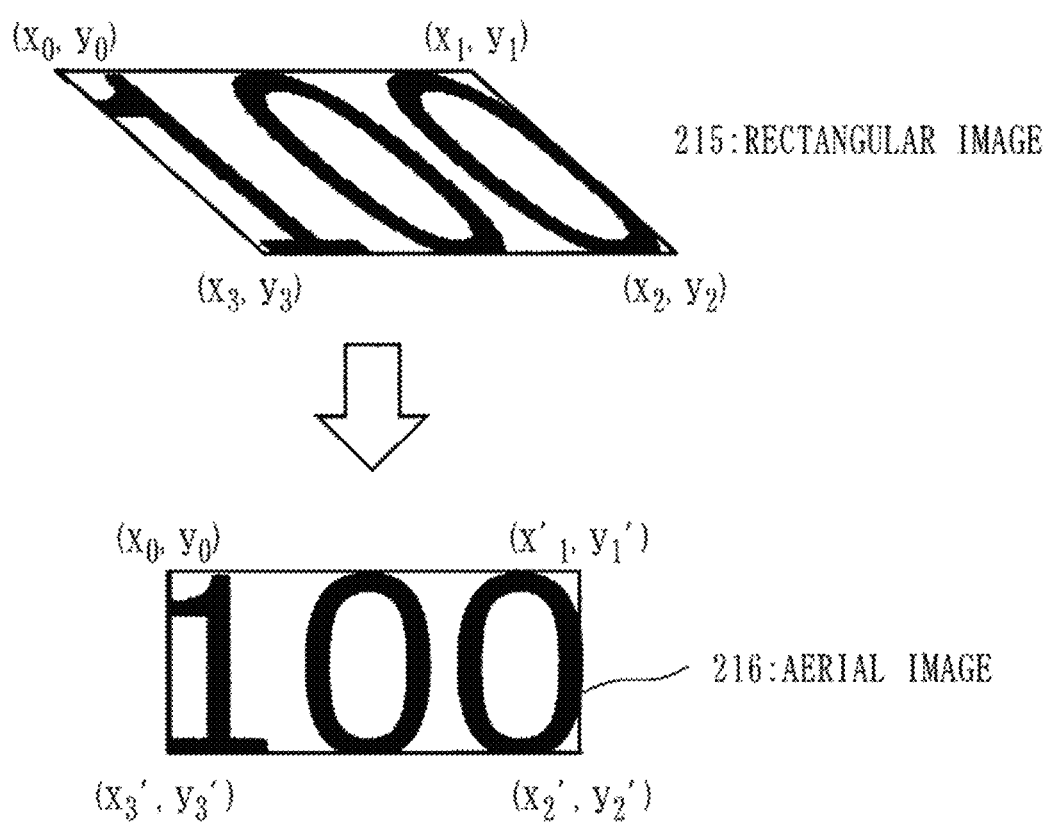
FIG. 26 is a diagram illustrating conversion from a rectangular image 215 to an aerial image 216 according to Embodiment 2.

Conversion of a rectangular image 215 to an aerial image 216 is illustrated in FIG. 26.

The rectangular image 215 is obtained when photographing "100" from a diagonal direction. "100" is shown diagonally in the rectangular image 215. On the other hand, "100" of when photographed from the front is shown in the aerial image 216.

A two-dimensional coordinate value $(x_i, y_i)\{i=1 \text{ to } 3\}$ of each vertex of the rectangular image 215 is converted to a two-dimensional coordinate value $(x'_i, y'_i)$ of each vertex of the aerial image 216.

Returning to FIG. 25, description will continue from step S134.

In step S134, the geographic object recognition unit 120 identifies the geographic object by an identification process for each aerial image.

Specifically, the geographic object recognition unit 120 executes the identification process with each aerial image as an input. Thus, an identification result for each character in the road marking is obtained.

For example, a technique using a neural network can be applied as the identification process. The technique using the neural network is disclosed in Non-Patent Literature 3.

In step S135, the geographic object recognition unit 120 verifies whether or not there is image data that was not selected (unselected image data) in step S131.

When there is unselected image data, the process proceeds to step S131.

When there is no unselected image data, the process ends.

Figure 21:
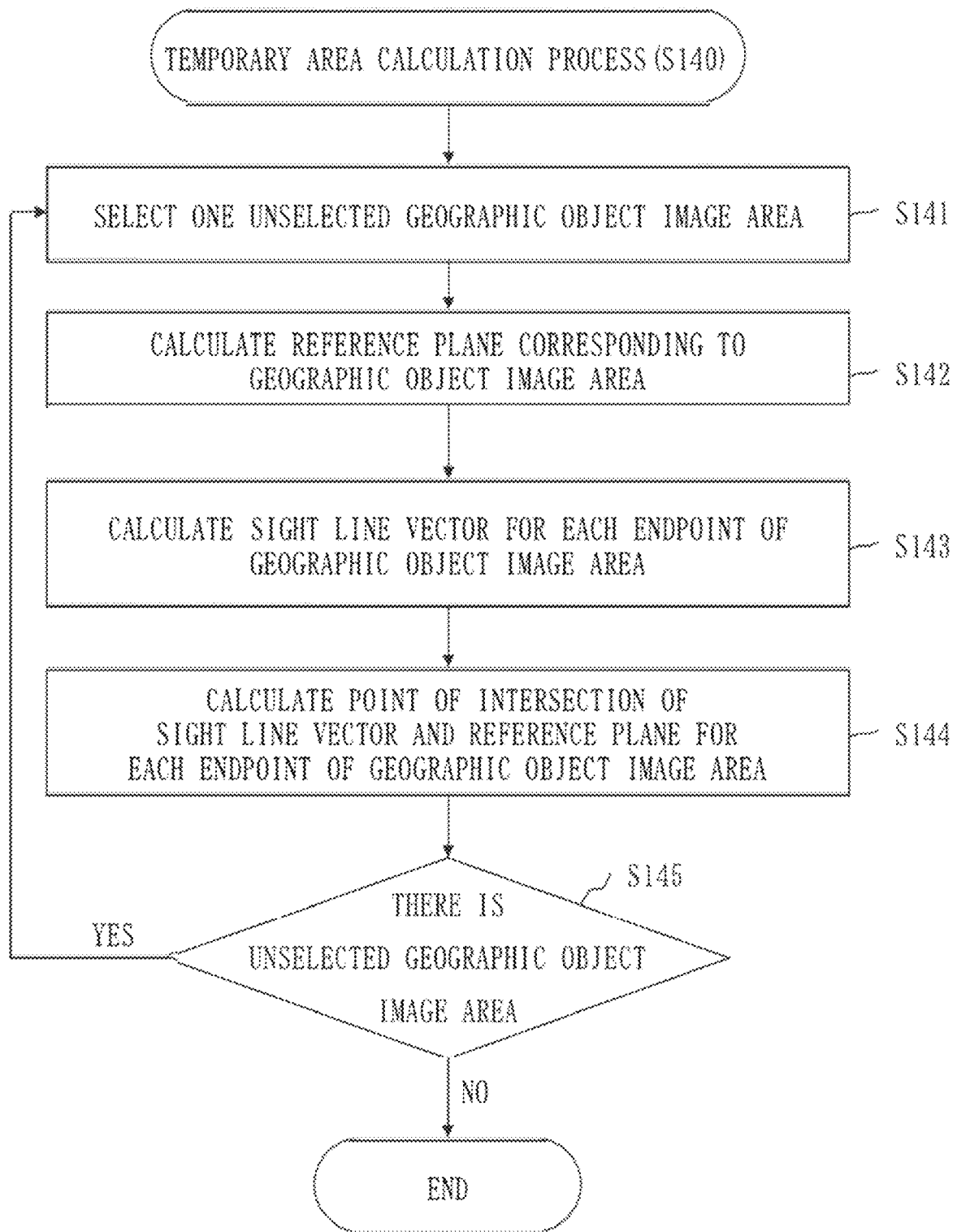
FIG. 21 is a flowchart of a temporary area calculation process (S140) according to Embodiment 1.

A procedure of the temporary area calculation process (S140) is the same as the procedure of that in Embodiment 1 (refer to FIG. 21).

Description on calculating of the reference plane will be supplemented. When the pixel belongs to a road marking area on a surface of a road, an equation of a plane corresponding to the surface of the road is sought for based on a point cloud.

Figure 23:
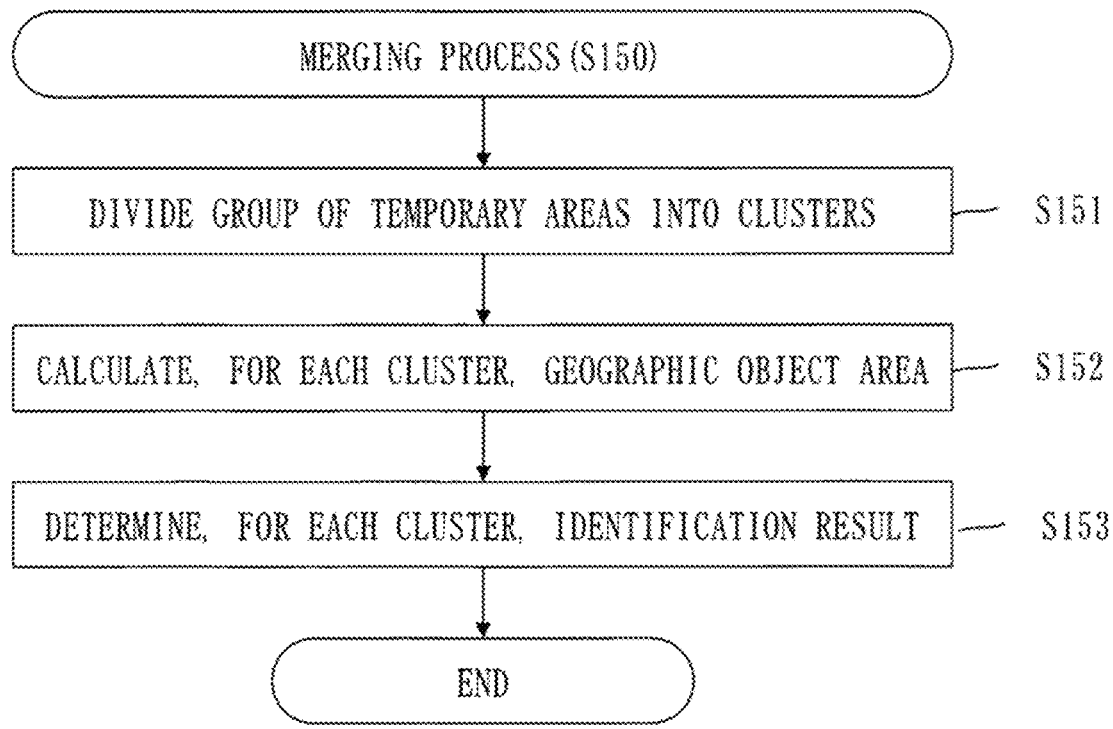
FIG. 23 is a flowchart of a merging process (S150) according to Embodiment 1.

A procedure of the merging process (S150) is the same as the procedure of that in Embodiment 1 (refer to FIG. 23). Details of each step, however, differs from details of those in Embodiment 1.

In step S151, the position specification unit 130 divides the group of temporary areas into clusters.

A method to divide into clusters is the same as the method of that in Embodiment 1.

In step S152, the position specification unit 130 calculates, for each cluster, the geographic object area by merging one or more temporary areas belonging to the cluster.

Specifically, the position specification unit 130 calculates a rectangular area, which is one or more temporary areas belonging to the cluster being coupled. The area calculated is the geographic object area.

Figure 27:
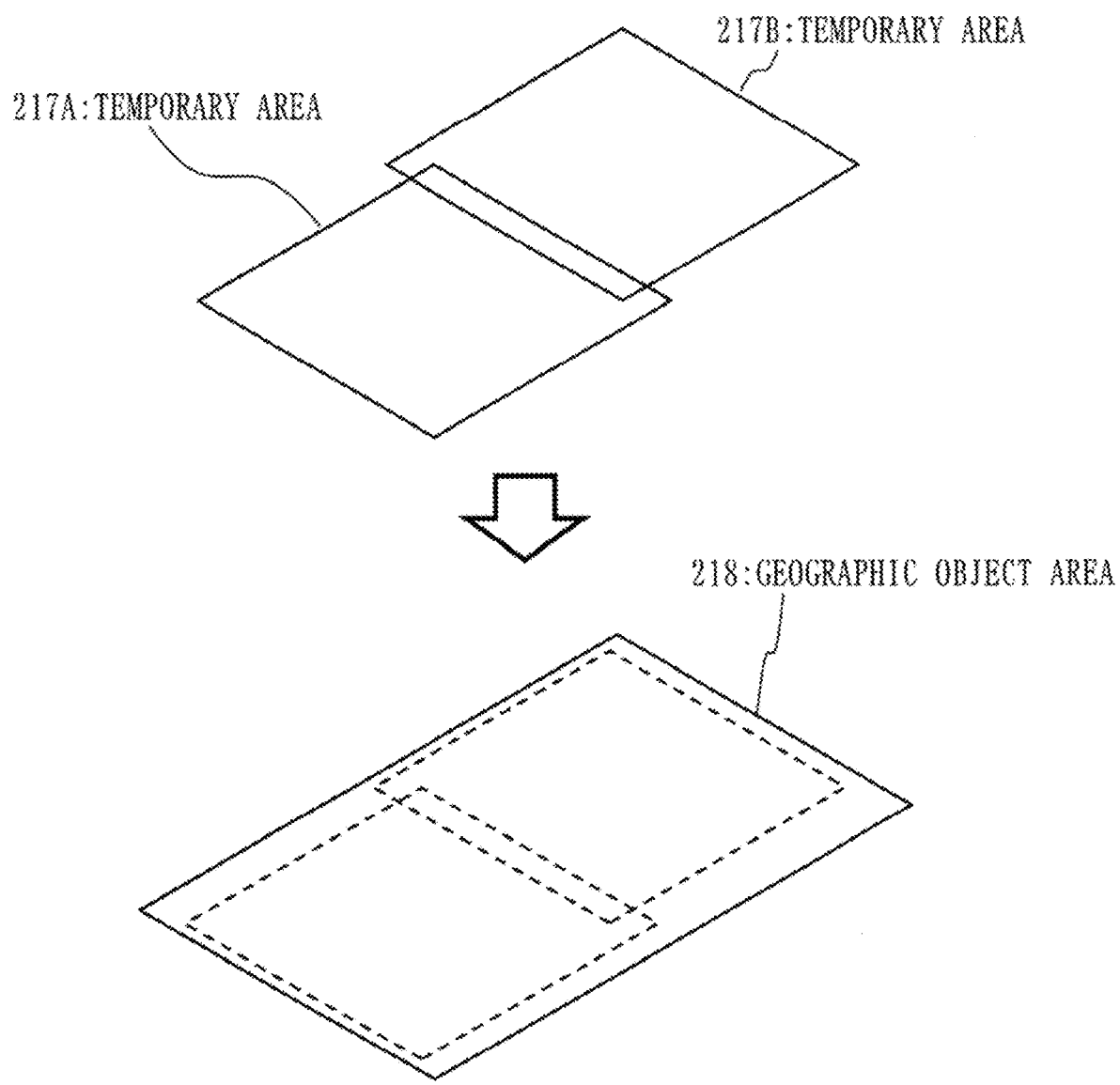
FIG. 27 is a diagram illustrating merging into a geographic object area 218 from temporary areas (217A, 217B) according to Embodiment 2.

A temporary area 217A, a temporary area 217B, and a geographic object area 218 are illustrated in FIG. 27.

The geographic object area 218 is a rectangular area of which the temporary area 217A and the temporary area 217B are coupled.

In step S153, the position specification unit 130 determines, for each cluster, an identification result by merging one or more identification results corresponding to one or more temporary areas belonging to the cluster.

Specifically, the position specification unit 130 generates one road marking (character string) by coupling one or more characters that one or more identification results indicate. The road marking generated is the identification result.

Effect of Embodiment 2

The geographic object having two or more elements being separated can be detected according to Embodiment 2. Specifically, the road marking marked on the road surface can be identified.

SUMMARY OF EMBODIMENTS

In the embodiments, the image data and the point cloud data are associated with each other, and the geographic object detected using the image data is reconstructed using the point cloud data. Thus, detection of the geographic object, specification of the type of the geographic object, and specification of a three-dimensional position of the geographic object can be realized accurately.

When the geographic object is to be detected using only the image data, a highly accurate three-dimensional coordinate value that the point cloud data holds cannot be used. By both the image data and the point cloud data being used as in the embodiments, however, the three-dimensional position of the geographic object can be specified accurately.

When the geographic object is to be detected using only the point cloud data, specifying a specific type of the geographic object is difficult. For example, specifying the type of the road sign or the type of the road marking is difficult. In the embodiments, the detection of the geographic object and the specification of the type of the geographic object are performed using the image data. Consequently, it will be possible to categorize the geographic object in more detail.

In the embodiments, the candidate area of the geographic object is specified using the point cloud data. Then, the process using the image data is performed for the candidate area specified. Thus, the calculation amount in the data processing can be reduced. As a result, the processing time is shortened.

In the embodiments, the identification device for specifying the type (class) of the road sign and the identification device for specifying the specific type of the road sign are used. Thus, accuracy in identifying the type of the sign can be improved.

In the embodiments, the road marking is identified after the image viewpoint conversion. Consequently, accuracy in identifying the road marking can be improved.

In the embodiments, the detection of the geographic object and the specification of the type of the geographic object are performed for each frame (image). Then, after reconstruction using the point cloud data, the geographic objects that are close are collected, and the type of the geographic object is specified based on a detection result of each frame. Consequently, compared with a case where the type of the geographic object being specified using one image, misdetection can be reduced.

Supplement to Embodiments

The embodiments are examples of preferred modes, and are not intended to limit the technical scope of the present invention. The embodiments may be executed partially or may be executed being combined with other modes. The procedures described using the flowcharts and the like may be changed as appropriate.

Each device described in the embodiments may be realized by a plurality of devices. That is, each device described in the embodiments may be realized by a system.

"Unit" may be replaced with "process" or "step".

REFERENCE SIGNS LIST

100: geographic object detection apparatus; 101: processor; 102: memory; 103: auxiliary storage device; 104: communication device; 105: input/output interface; 110: candidate extraction unit; 120: geographic object recognition unit; 130: position specification unit; 190: storage unit; 191: three-dimensional point cloud data; 192: image data; 200: three-dimensional point cloud; 201: geographic object area; 202: candidate area; 210: image; 211: geographic object image area; 212: rectangular image; 213: road sign; 214: area image; 215: rectangular image; 216: aerial image; 217: temporary area; 218: geographic object area; 220: three-dimensional space; 221: geographic object area; 230: convolutional neural network; 240: information sign characteristic data; 241: input characteristic vector.

The invention claimed is:

1. A geographic object detection apparatus comprising:
a processor to execute a program; and
a memory to store the program which, when executed by the processor, performs processes of,
calculating, using three-dimensional point cloud data indicating a three-dimensional coordinate value of each of a plurality of points in a measurement region, a candidate area that is a candidate for a three-dimensional area where a geographic object is positioned,
calculating, using image data obtained by photographing in the measurement region, a candidate image area where the candidate area is shown, detecting a geographic object image area where the geographic object is shown by image processing on the candidate image area, and recognizing a type of the geographic object; and
calculating a three-dimensional area corresponding to the geographic object image area as a geographic object area where the geographic object is positioned, and specifying a position of the geographic object, wherein
the geographic object has two or more elements that are being separated,
the program detects, from an image that the image data represents, two or more element image areas corresponding to the two or more elements as the geographic object image area, and
the program calculates, using the three-dimensional point cloud data, two or more three-dimensional areas corresponding to the two or more element image areas as two or more element areas, and calculates the geographic object area by merging the two or more the element areas calculated.

2. The geographic object detection apparatus according to claim 1, wherein
the geographic object is a road sign, and
the program identifies a type of the road sign, selects, from a plurality of identification devices corresponding to a plurality of types of road signs, an identification device corresponding to the type of the road sign identified, and identifies the road sign using the identification device selected.

3. The geographic object detection apparatus according to claim 1, wherein
the geographic object is a road marking marked on a road surface,
the road marking has two or more characters that are being separated,
the three-dimensional point cloud data includes a plurality of three-dimensional points representing a plurality of points that reflected laser light in a laser measurement,
each three-dimensional point indicates the three-dimensional coordinate value and reflection intensity, and
the program extracts a plurality of three-dimensional points representing a plurality of points positioned on the road surface from the three-dimensional point cloud data based on an altitude of the road surface as a road surface point cloud, extracts two or more three-dimensional points positioned on a character part for each character included in the road marking from the road surface point cloud extracted based on the three-dimensional coordinate value and the reflection intensity of each of the plurality of three-dimensional points included in the road surface point cloud extracted as a candidate point cloud, and calculates a candidate area based on a three-dimensional coordinate value of each of the two or more three-dimensional points included in the candidate point cloud for each candidate point cloud extracted.

4. The geographic object detection apparatus according to claim 1, wherein
the program converts the two or more element image areas to two or more aerial images, and identifies the two or more elements based on the two or more aerial images.

5. The geographic object detection apparatus according to claim 1, wherein
the geographic object is the road marking,
the two or more elements are two or more characters that configure the road marking, and
the program identifies the two or more characters by the image processing on the two or more element image areas, and identifies the road marking based on the two or more characters.

6. A geographic object detection apparatus comprising:
a processor to execute a program; and
a memory to store the program which, when executed by the processor, performs processes of,
calculating, using three-dimensional point cloud data indicating a three-dimensional coordinate value of each of a plurality of points in a measurement region, a candidate area that is a candidate for a three-dimensional area where a geographic object is positioned,
calculating, using image data obtained by photographing in the measurement region, a candidate image area where the candidate area is shown, detecting a geographic object image area where the geographic object is shown by image processing on the candidate image area, and recognizing a type of the geographic object, and
calculating a three-dimensional area corresponding to the geographic object image area as a geographic object area where the geographic object is positioned, and specifying a position of the geographic object, wherein
the program detects, using a plurality of pieces of image data obtained by photographing at a plurality of photographing points, a plurality of geographic object image areas from a plurality of images that the plurality of pieces of image data represent, and
the program calculates a plurality of temporary areas corresponding to the plurality of geographic object image areas detected, and calculates an endpoint of the geographic object area for each endpoint of the plurality of temporary areas calculated.

7. The geographic object detection apparatus according to claim 6, wherein
the geographic object is a road sign, and
the program identifies a type of the road sign, selects, from a plurality of identification devices corresponding to a plurality of types of road signs, an identification device corresponding to the type of the road sign identified, and identifies the road sign using the identification device selected.

8. A geographic object detection method comprising:
calculating, using three-dimensional point cloud data indicating a three-dimensional coordinate value of each of a plurality of points in a measurement region, a candidate area that is a candidate for a three-dimensional area where a geographic object is positioned;
calculating, using image data obtained by photographing in the measurement region, a candidate image area where the candidate area is shown, detecting a geographic object image area where the geographic object is shown by image processing on the candidate image area, and recognizing a type of the geographic object; and calculating a three-dimensional area corresponding to the geographic object image area as a geographic object area where the geographic object is positioned, and specifying, a position of the geographic object, wherein the geographic object has two or more elements that are being separated, the detecting the geographic object image area detects, from an image that the image data represents, two or more element image areas corresponding to the two or more elements as the geographic object image area, and the calculating the geographic object area calculates, using the three-dimensional point cloud data, two or more three-dimensional areas corresponding to the two or more element image areas as two or more element areas, and calculates the geographic object area by merging the two or more the element areas calculated.

* * * * *